US011279823B2

(12) United States Patent
Mohanty et al.

(10) Patent No.: US 11,279,823 B2
(45) Date of Patent: Mar. 22, 2022

(54) BIODEGRADABLE NANOSTRUCTURED COMPOSITES

(71) Applicant: UNIVERSITY OF GUELPH, Guelph (CA)

(72) Inventors: Amar Kumar Mohanty, Guelph (CA); Manjusri Misra, Guelph (CA); Feng Wu, Guelph (CA)

(73) Assignee: UNIVERSITY OF GUELPH, Guelph (CA)

( * ) Notice: Subject to any disclaimer, the term of this patent is extended or adjusted under 35 U.S.C. 154(b) by 0 days.

(21) Appl. No.: 16/772,998

(22) PCT Filed: Dec. 14, 2018

(86) PCT No.: PCT/CA2018/051607
§ 371 (c)(1),
(2) Date: Jun. 15, 2020

(87) PCT Pub. No.: WO2019/113713
PCT Pub. Date: Jun. 20, 2019

(65) Prior Publication Data
US 2021/0079211 A1 Mar. 18, 2021

Related U.S. Application Data

(60) Provisional application No. 62/599,402, filed on Dec. 15, 2017.

(51) Int. Cl.
C08L 67/04 (2006.01)
C08J 3/24 (2006.01)
(52) U.S. Cl.
CPC .............. C08L 67/04 (2013.01); C08J 3/246 (2013.01); C08J 2367/04 (2013.01); C08J 2467/02 (2013.01)
(58) Field of Classification Search
CPC ..................................................... C08J 3/246
See application file for complete search history.

(56) References Cited

U.S. PATENT DOCUMENTS

| 5,252,642 | A | 10/1993 | Sinclair et al. | |
|---|---|---|---|---|
| 5,594,095 | A | 1/1997 | Gruber et al. | |
| 7,037,983 | B2 | 5/2006 | Huang et al. | |
| 7,393,590 | B2 | 7/2008 | Scheer et al. | |
| 7,927,532 | B2 | 4/2011 | Scheer | |
| 8,231,954 | B2 | 7/2012 | Li et al. | |
| 8,334,348 | B2 | 12/2012 | Hogt et al. | |
| 2005/0137356 | A1 | 6/2005 | Hale et al. | |
| 2005/0277742 | A1 | 12/2005 | Roegiers | |
| 2009/0192264 | A1* | 7/2009 | Laborie | B82Y 40/00 525/54.21 |
| 2010/0076099 | A1* | 3/2010 | Mohanty | C08L 67/02 521/91 |
| 2010/0240806 | A1* | 9/2010 | Kondo | C08J 5/045 524/35 |
| 2012/0283363 | A1* | 11/2012 | Kumamoto | C08L 97/02 524/35 |
| 2014/0073745 | A1 | 3/2014 | Bailey et al. | |
| 2015/0361258 | A1 | 12/2015 | Mohanty et al. | |
| 2016/0177086 | A1 | 6/2016 | Marini et al. | |
| 2017/0260360 | A1* | 9/2017 | Groseling | B32B 27/065 |
| 2018/0118936 | A1* | 5/2018 | Nelson | C08L 67/04 |
| 2018/0127554 | A1 | 5/2018 | Mohanty et al. | |

FOREIGN PATENT DOCUMENTS

CN 1046728825 6/2015

OTHER PUBLICATIONS

Jun et al. (Carbohydrate Polymers 168, 2017, 255-262) (Year: 2017).*
Kfoury, G., et al., Recent advances in high performance poly(lactide): from "green" plasticization to super-tough materials via (reactive) compounding. Frontiers in Chemistry, 2013. 1: p. 32.
Reddy, M.M., et al., Biobased plastics and bionanocomposites: Current status and future opportunities. Progress in Polymer Science, 2013 (0).
Wu, S., Chain structure, phase morphology, and toughness relationships in polymers and blends. Polymer Engineering & Science, 1990. 30(13): p. 753-761.
Perkins, W.G., Polymer toughness and impact resistance. Polymer Engineering & Science, 1999. 39(12): p. 2445-2460.
Ha, C.-S., et al., Fracture toughness and properties of plasticized PVC and thermoplastic polyurethane blends. Polymer, 1998. 39(20): p. 4765-4772.
Sha, Y., et al., Fracture toughness and failure mechanisms of epoxy/rubber-modified polystyrene (HIPS) interfaces reinforced by grafted chains. Macromolecules, 1996. 29(13): p. 4728-4736.
Zhang, H., et al., Temperature dependence of crack initiation fracture toughness of various nanoparticles filled polyamide 66. Polymer, 2006. 47(2): p. 679-689.
Mouzakis, D.E., et al., Fracture toughness assessment of poly (ethylene terephthalate) blends with glycidyl methacrylate modified polyolefin elastomer using essential work of fracture method. Journal of applied polymer science, 2001. 79(5): p. 842-852.

(Continued)

Primary Examiner — Liam J Heincer
(74) Attorney, Agent, or Firm — Eduardo Krupnik

(57) ABSTRACT

A highly compatibilized biodegradable composite with high impact strength including: (a) a polymeric matrix having one or more biodegradable polymers; (b) one or more fillers; and (c) free radical initiators are fabricated via one-step reactive extrusion method. An in-situ free radical reaction method of manufacturing the biodegradable composite, including the step of (a) (1) mixing one or more biodegradable polymers and a free radical initiator; (2) melting step (1) thereby manufacturing the highly compatibilized biodegradable matrix. (b) Mixing the composites of step (a) and fillers or second biodegradable polymers, thereby manufacturing the biodegradable composite. Also, nano-blends are successfully prepared in this invention ascribe to the improved compatibility of the different components.

21 Claims, 3 Drawing Sheets

(56) References Cited

OTHER PUBLICATIONS

Chen, H., et al., Fracture toughness of α- and β-phase polypropylene homopolymers and random- and block-copolymers. Polymer, 2002. 43(24): p. 6505-6514.
Schneiderman, D.K. and M.A. Hillmyer, 50th Anniversary Perspective: There Is a Great Future in Sustainable Polymers. Macromolecules, 2017. 50(10): p. 3733-3749.
Tzoganakis, C., Reactive extrusion of polymers. Encyclopedia of Polymer Science and Technology, 2012, p. 1-28.
International Search Report and The Written Opinion of the International Searching Authority for International application No. PCT/CA2018/051607, dated Mar. 13, 2019.
Ma, P. et al. In-situ compatibilization of poly(lactic acid) and poly(butylene adipate-co-terephthalate) blends by using dicumyl peroxide as a free-radical initiator. Polymer Degradation and Stability 102 (2014) 145-151.
Takamura, M., et al., Influence of extrusion temperature on molecular architecture and crystallization behavior of peroxide-induced slightly crosslinked poly(L-lactide) by reactive extrusion. Journal of Applied Polymer Science, 2012. 123(3): p. 1468-1478.
Detyothin, S., et al., Reactive functionalization of poly(lactic acid), PLA: Effects of the reactive modifier, initiator and processing conditions on the final grafted maleic anhydride content and molecular weight of PLA. Polymer Degradation and Stability, 2013. 98(12): p. 2697-2708.
Ma, P., et al., Structure/Property Relationships of Partially Cross-linked Poly(butylene succinate). Macromolecular Materials and Engineering, 2013. 298(8): p. 910-918.
Yang, S.-I., et al., Thermal and mechanical properties of chemical crosslinked polylactide (PLA). Polymer Testing, 2008. 27(8): p. 957-963.
Wang, R., et al., Toughening modification of PLLA/PBS blends via in situ compatibilization. Polymer Engineering & Science, 2009. 49(1): p. 26-33.
Ji, D., et al., Morphology, Rheology, Crystallization Behavior, and Mechanical Properties of Poly(lactic acid)/Poly(butylene succinate)/Dicumyl Peroxide Reactive Blends. Journal of Applied Polymer Science, 2014. 1: p. 39580-39588.
Coltelli, M.-B., S. Bronco, and C. Chinea, The effect of free radical reactions on structure and properties of poly(lactic acid) (PLA) based blends. Polymer Degradation and Stability, 2010. 95(3): p. 332-341.
Ma, P., et al., Toughening of PHBV/PBS and PHB/PBS Blends via In situ Compatibilization Using Dicumyl Peroxide as a Free-Radical Grafting Initiator. Macromolecular Materials and Engineering, 2012. 297(5): p. 402-410.
Muthuraj, R., M. Misra, and A.K. Mohanty, Biodegradable Poly(butylene succinate) and Poly(butylene adipate-co-terephthalate) Blends: Reactive Extrusion and Performance Evaluation. Journal of Polymers and the Environment, 2014. 22(3): p. 336-349.
Oyama, H.T., Super-tough poly (lactic acid) materials: Reactive blending with ethylene copolymer. Polymer, 2009. 50(3): p. 747-751.
Liu, H., et al., Effects of Metal Ion Type on Ionomer-Assisted Reactive Toughening of Poly(lactic acid). Industrial & Engineering Chemistry Research, 2013. 52(13): p. 4787-4793.
Liu, H., et al., Effects of reactive blending temperature on impact toughness of poly(lactic acid) ternary blends. Polymer, 2012. 53(2): p. 272-276.
Liu, H., et al., Super Toughened Poly(lactic acid) Ternary Blends by Simultaneous Dynamic Vulcanization and Interfacial Compatibilization. Macromolecules, 2010. 43(14): p. 6058-6066.
Liu, H.Z., W.J. Song, and J. Zhang, Interaction of Microstructure and Interfacial Adhesion on Impact Performance of Polylactide (PLA) Ternary Blends. Macromolecules, 2011. 44(6): p. 1513-1522.
Yuryev, Y., A.K. Mohanty, and M. Misra, A New Approach to Supertough Poly(lactic acid): A High Temperature Reactive Blending. Macromolecular Materials and Engineering, 2016. 301(12): p. 1443-1453.
Zhang, K., et al., Supertoughened Renewable PLA Reactive Multiphase Blends System: Phase Morphology and Performance. ACS Applied Materials & Interfaces, 2014. 6(15): p. 12436-12448.
Bitinis, N., et al., Structure and properties of polylactide/natural rubber blends. Materials Chemistry and Physics, 2011. 129(3): p. 823-831.
Zhang, C., et al., Thermal, mechanical and rheological properties of polylactide toughened by expoxidized natural rubber. Materials & Design, 2013. 45: p. 198-205.
Hu, X., et al., Preparation, morphology and superior performances of biobased thermoplastic elastomer by in situ dynamical vulcanization for 3D-printed materials. Polymer, 2017. 108: p. 11-20.
Hu, X., et al., Renewable and Supertoughened Polylactide-Based Composites: Morphology, Interfacial Compatibilization, and Toughening Mechanism. Industrial & Engineering Chemistry Research, 2016. 55(34): p. 9195-9204.
Liu, G.-C., et al., Fully Biobased and Supertough Polylactide-Based Thermoplastic Vulcanizates Fabricated by Peroxide-Induced Dynamic Vulcanization and Interfacial Compatibilization. Biomacromolecules, 2014. 15(11): p. 4260-4271.
Zhang, K., M. Misra, and A.K. Mohanty, Toughened Sustainable Green Composites from Poly(3-hydroxybutyrate-co-3-hydroxyvalerate) Based Ternary Blends and Miscanthus Biofiber. ACS Sustainable Chemistry & Engineering, 2014. 2(10): p. 2345-2354.
Muthuraj, R., M. Misra, and A.K. Mohanty, Injection Molded Sustainable Biocomposites From Poly(butylene succinate) Bioplastic and Perennial Grass. ACS Sustainable Chemistry & Engineering, 2015. 3(11): p. 2767-2776.
Rabnawaz, M., et al., A roadmap towards green packaging: the current status and future outlook for polyesters in the packaging industry. Green Chemistry, 2017. 19(20): p. 4737-4753.
Bumbudsanpharoke, N. and S. Ko, Nano-Food Packaging: An Overview of Market, Migration Research, and Safety Regulations. Journal of Food Science, 2015. 80(5): p. R910-R923.
Reddy, M.M., et al., Biobased plastics and bionanocomposites: Current status and future opportunities. Progress in Polymer Science, 2013. 38: p. 1653-1689.
Mohanty, A. and R. Bhardwaj, Nanostructure Controlled Bioplastics in the Design and Engineering of Sustainable Multifunctional Green Materials.
Bhardwaj, R. and A.K. Mohanty, Modification of Brittle Polylactide by Novel Hyperbranched polymer based nanostructure. Biomacromolecules, 2007. 8: p. 2476-2484.
Ruzette, A.-V. and L. Leibler, Block copolymers in tomorrow's plastics. Nature materials, 2005. 4(1): p. 19-31.
Hiroshi Shimizu, Y.L., Akira Kaito, and and H. Sano, Formation of Nanostructured PVDF/PA11 Blends Using High-Shear Processing Macromolecules, 2005. 38: p. 7880-7883.
SABIC, Innovative Plastics-Oxygen and Water Permeability. 2013, SABIC: www.sabic-ip.com.

\* cited by examiner

BIODEGRADABLE NANOSTRUCTURED COMPOSITES

CROSS REFERENCE TO RELATED APPLICATIONS

This application is a national stage application under 35 U.S.C. 371 of International Application No. PCT/CA2018/051607, filed Dec. 14, 2018, which in turn claims the benefit under 35 U.S.C. 119(e) of U.S. Provisional Ser. No. 62/599,402, filed Dec. 15, 2017, the contents of each of which are hereby incorporated by reference into the present disclosure.

FIELD OF THE INVENTION

The present invention relates to biodegradable nanostructured polymer biocomposites and methods of making those.

BACKGROUND OF THE INVENTION

The increased environmental concern on landfilling disposal of non-biodegradable plastics and sustainable development of petrol-based polymers promotes a significant research requirement on developing fully biodegradable products with high bio-based contents. The developed biodegradable polymeric materials can be widely used today in different areas such as packaging, agriculture, automotive, pharmaceutical, and others [1]. According to their production method, the bioplastic can be classified as renewable-resource-based such as polylactide (PLA), poly(butylene succinate) (PBS), petroleum based such as poly(butylene adipate-co-terephthalate) (PBAT) and from mixed source such as poly (trim ethylene terephthalate) (PTT). While based on the chemical nature, bioplastics can be defined as biodegradable and non-biodegradable, for example bio-derived PTT are not biodegradable where as 100% petro-derived PBAT is biodegradable [2]. Our current invention mainly focused on fully biodegradable polymer formulations such as PLA, PBS, PBAT, polycaprolactone (PCL), polyhydroxyalkanoate PHA(s), et al. with high performance.

Filler reinforced polymer composites have been continuously researched for decades because of the reinforcement effects and cost saving. Compostable products based on biodegradable polymers and natural fillers and fibers can be practical candidates to solve the aforementioned problems: the dependence on petroleum and landfilling waste management. The fillers used in composites researche include, but is not limited to: 1) perennial grass such as *Miscanthus* fiber, switchgrass and bamboo; 2) natural fillers such as talc, nano-cellulose fiber and calcium carbonate; 3) waste/by-products from agriculture faming and processing industry such as coffee husk and tea leaves; 4) High-value fillers such as carbon fibers, carbon nanotubes and graphene. Among them, natural fibers from renewable resources, such as *Miscanthus* fiber, provide environmental benefits with respect to ultimate disposal as well as low cost and high yield.

To enlarge the application field of polymer materials, super toughened polymer based materials (defined as notched impact strength>530 J/m [3]) have drawn scientific and industry attentions for decades since toughness is one of the most important properties in the reality application of these materials [4]. The impact resistance, a measure of the ability of a material to withstand the stress of a sudden load without "failure" during its service lifetime, is a critical mechanical property, because it relates to the safety, liability, and service life of the plastic product [5]. Therefore, toughening modification of traditional brittle plastics such as polyvinyl chloride (PVC) [6], polystyrene (PS) [7], polyamide (PA) [8], polyethylene terephthalate (PET) [9] and polypropylene (PP) [10] has been extensively researched and reported. However, with the increasing attention on the global environmental issues and shortages of our finite petroleum resources, sustainable biodegradable polymers with superior properties should be paid more attention in various fields such as packaging, automotive, household electricals and agriculture [11]. Amounts of novel biobased and biodegradable polymers with different properties, such as Poly lactide (PLA), poly(butylene succinate) (PBS), poly(butylene adipate-co-terephthalate) (PBAT), and polycaprolactone (PCL) and polyhydroxyalkanoate (PHA(s)), have been developed and modified extensively in recent years [2]. Nevertheless, inherent inferior properties of these polymers limit their applications for almost all structural materials in market when used alone.

Melt blending different kinds of polymers, biodegradable or non-biodegradable, has been proven to be an economic and effective method in preparing balanced performance materials. Unfortunately, most polymer blends possess poor mechanical properties because of the immiscibility of the polymer, so that simple physical blending does not usually yield satisfactory results. To improve the compatibility of the blends and increase the interfacial adhesion, a solution named "in-situ extrusion reaction" that involves chemical reaction of the components during melt blending is widely researched. In particular, reactive blending makes it possible to improve impact strength to achieve 'super-toughened' polymer materials which require strong interfacial adhesion between the matrix and dispersed phase.

Different types of reactions can be carried out in the reactive polymer processing, either from monomer or oligomers to high molecular weight polymer [12], or more often, from polymer to modified polymer (grafting, functionalization or co-polymer formation), to shaped and structured finished products [13]. Because of the significant commercial value to industry, most of the early work on reactive processing is to be found in patent documents, and in a good deal of industrial secrecy [14]. Different kinds of function groups, for e.g. maleic anhydride or acrylic acid, can attach on the saturated chain in the presence of a free-radical initiator through extrusion reactions. Another example of chain modification reactive processing reactions is those that control the melt flow index by inducing controlled long chain branching or (light) cross-linking. However, as discussed previously, the majority of new blends of existing commodity or engineering polymers are practically immiscible. Thus, commercial blends are made by reactively forming a block copolymer at the interface during reactive polymer processing operations. The early researched saturated chains are mainly HDPE, PP [15] and ethylene-propylene copolymer (EPR), etc. With the developing of the biodegradable polymers, more and more reaction extrusion researches on these materials are carried out.

A number of patents and research publications have been filed that disclose the modification of bioplastics using reactive extrusion. U.S. Pat. No. 5,594,095 discloses the modification of polylactic acid with linear organic peroxides such as 2,5-dimethyl-2,5-di(tert-butylperoxy)hexane and dicumyl peroxide, to improve the melt strength of PLA. U.S. Pat. No. 8,334,348 B2 discloses the modification of biodegradable polymers using cyclic organic peroxide, resulting in (co)polymers with a high degree of branching but free of gel formation. U.S. Pat. No. 8,231,954 B2 discloses a method of producing a thermoformable composite by cross-linking PHA and PLA together in the presence of an additive (peroxide) to produce PHA and PLA blend with high heat distortion index of up to about 160° C. U.S. Pat. No. 7,037,983 describes functional biopolymers with a vinyl monomer in the present of initiators such as free radical initiators. U.S. Pat. No. 7,393,590 discloses a coating or film formulation which by blending poly(lactic acid), and poly (epsilon caprolactone) together in the presence of organic peroxide. Peroxide-induced crosslinked [16] or functional [17] biopolymers by reactive extrusion [18, 19]; peroxide induced compatibility of biopolymer blends have been researched by many institutes [20-23]. The above research shows that the peroxide can react with different kinds of biopolymers, such as PLA, PBS, PBAT, PHA, poly(3-hydroxy)butyrate (PHB) and poly(3-hydroxybutyrate-hydroxyvalerate) (PHBV) et. al.

To fabricate super-toughened biopolymers with high impact strength, different kinds of polymer blends have been researched. U.S. Pat. No. 5,252,642 depicts an environmentally degradable composition by blending PLA with a blend-compatible elastomer that provides improved impact resistance. US 20150361258 discloses a formulation of super toughened PLA-based blends showing non break impact with a thermoplastic elastomeric block copolymer and a functionalized polyolefin copolymer. US 20050137356 discloses a blends of 15 wt % to about 60 wt % flexible biodegradable and 85 wt % to 40 wt % rigid biodegradable polymers with improved rheology and improved unnotched impact strength at least 20 ft-lbs/in at 23° C. according to ASTM D256. U.S. Pat. No. 8,076,406 relates to a composite having improved impact resistance by blending PLA with polyamide and functionalized polyolefin. By blending 60 wt % PBS and 40 wt % PBAT together, Rajendran fabricated a biodegradable formulation showing non-break impact behavior [24]. As an important elastomer, the ethylene based rubbers like ethylene methyl acrylate-glycidyl methacrylate (EMA-GMA), poly(ethylene-glycidyl methacrylate) (EGMA) [25], poly (ether-b-amide) copolymer (PEBA), have been widely used in improving the toughness of biopolymers and performs positive results. Zhang's group have done systemic studies on the toughening of PLA by EMA-GMA and EMAA-Zn, and they found that the type of compatibilizer [26], blending temperature [27, 28], composition ratios, phase morphology and suitable interfacial adhesion [29] influence the final impact strength of the composites. Yury et. al. also have a research on the toughening PLA by EMA-GMA with Joncryl as compatibilizer and found that the temperature influence the final impact strength of the PLA blends [30]. Zhang et. al prepared a toughening PLA/EMA-GMA/PEBA ternary blend by controlling the morphology [31]. Other studies on natural rubbers [32], epoxidized rubbers [33], thermoplastic vulcanizate (TPV) [34, 35] and vulcanized unsaturated aliphatic polyester elastomer (UPE) [36] also have been investigated. So far, the elastomer is widely used as an impact modifier in the biodegradable polymer. As far as we know, no results were reported on the super-toughened biodegradable composites (Notched Impact Strength>530 J/m) based on the commercial biopolymer blends with high bio contents.

Reactive extrusion on PBS/PBAT binary or PLA/PBS/PBAT ternary blends using peroxide have not been reported. However, related reports on PLA/PBS, PLA/PBAT, PHBV/PBS, PHB/PBS or PLA/NR et al can be found. In one report PLA/PBAT/Peroxide research, the peroxide (DCP) amounts were used as 0.05, 0.1, 0.2, 0.5, 1 wt %. The notched Izod impact toughness of these blends reaches a maximum (110 J/m) at the DCP content of 0.5 wt %. At 0.05 DCP, the impact strength is reported as ~70 J/m, close to the blends without DCP (Ma et al. Polymer Degradation and Stability 102 (2014) 145-151) and not a super toughened polymer. In another research on the high impact strength of PBS/DCP (~29 kJ/m2), the used DCP amount is 3 phr. While the reported impact strength is much lower (P. Ma et al. Macromol. Mater. Eng. 2013, 298, 910-918). In a recent research on PLA/NBR samples, the DCP dosage is as low as 0.045 wt %, but the impact strength is reported as 18 kJ/m$^2$, i.e. not a super toughened polymer. The research all shows that small amount of peroxide is not enough for achieving high impact strength. And if high impact strength is required, high amounts of peroxide is always used. But the reported impact strength is still much lower than the value for super-toughened materials (~530 J/m) which has been realized in the formulations of the present invention, suggesting a structural change in the composite not achieved or anticipated by prior studies.

Using small amounts of free radical initiator is advantageous because the gel content in the final products is closely related to the peroxide contents. Gel content reduces the flowability of the blend. The low flowability will limit the processing of plastics by the common methods such as extrusion and injection molding, increasing the manufacturing cost and energy consumption. The large use of peroxide in the reactive extrusion will result in high gel contents (the reported gel content is 80 wt % in the PBS+3 phr DCP (P. Ma et al. Macromol. Mater. Eng. 2013, 298, 910-918)). However, the high gel contents are not good for the commercial thermoplastic processing, like extrusion, injection or blown molding. The reported crosslinked samples with large amounts of peroxide amount are usually prepared by compression molding which is not an efficient processing method.

The related research on the impact strength and gel contents of the biodegradable/peroxide formulations are listed as follow table 1.

TABLE 1

The related results on impact strength and gel contents on biodegradable/peroxide formulations

| Matrix Materials | Peroxide Used | Impact Strength | Gel Contents | Reference | Notes |
|---|---|---|---|---|---|
| PBS | DCP (3 phr) | 29 kJ/m$^2$ | 80 wt % | P. Ma et al. Macromol. Mater. Eng. 2013, 298, 910-918 | |
| PLA/Natural Rubbers | DCP | 7.36 kJ/m2 | | Yun Huang et al. J Polym Environ (2013) 21: 375-387 | Charpy impact strength |
| PLA80/PBAT20 | DCP (0.5 phr) | 110 J/m[1] | 6 wt %[2] | 1. P. Ma et al. Polymer Degradation and Stability 102 (2014) 145-151 | |

TABLE 1-continued

The related results on impact strength and gel contents on biodegradable/peroxide formulations

| Matrix Materials | Peroxide Used | Impact Strength | Gel Contents | Reference | Notes |
|---|---|---|---|---|---|
| PLA75/PBAT25 | Luperox (0.2) | Not Reported | Not Reported | 2. Francesca Signori et al. Macromol. Mater. Eng. 2015, 300, 153-160 Maria-Beatrice Coltelli et al. Polymer Degradation and Stability 95 (2010) 332-341 | Improved tension strain from 20 to 60% |
| PLA70/PBAT30 | Tetrabutyl titanate (0.2 phr) | 9 kJ/m | Not reported | Shan Lin. et al. Materials and Design 36 (2012) 604-608 | |
| PLA90/PBS10 | lysine triisocyanate (LTI) (0.5 phr) | 50-70 kJ/m$^2$ (Unnotched specimens) | Not reported | Masaki Harada, et al. Journal of Applied Polymer Science. 106 (2017) 1813-1820 | Charpy impact strength on unnotched specimens |
| PLA/PBSA | Triphenyl phosphite (TPP) (2 wt %) | 16.4 kJ/m$^2$ | | Vincent Ojijo et al. ACS Appl. Mater. Interfaces 2013, 5, 4266-4276 | Charpy impact strength |
| PBS | DCP (4 phr) | Not Reported | ~75 wt % | D. J. Kim et al. Journal of Applied Polymer Science, Vol. 81, 1115-1124 (2001) | Improved tension strain from 57 to 252% |
| PLA/PBAT/PC | DCP (0.3 phr) | 3 kJ/m$^2$ | | Takeshi Kanzawa et al. Journal of Applied Polymer Science, Vol. 121, 2908-2918 (2001) | |
| PLLA 90/NBR 10 | DCP (0.045 wt %) | ~18 kJ/m$^2$ | | Lu Liu et al. Ind. Eng. Chem. Res. 2016, 55, 9907-9914 | |
| PHBV80/PBS 20 | DCP (1 phr) | 55 kJ/m$^2$ | ~27 wt % | P. Ma et al. Macromol. Mater. Eng. 2012, 297, 402-410 | |

Besides the high impact toughness, heat deflection temperature (HDT) is also important in the application of plastic materials because it decides the upper limit temperature for utility of the products. Most research on increasing the HDT is focused on increasing crystallinity of the materials or introducing fillers. For example, US 20160177086 depicts a biodegradable polymer composition of PLA, aromatic aliphatic polyester, cellulose fibers and nucleation agents, which show a high HDT. Both Rajendran and Zhang's studies showed that the addition of *Miscanthus* fiber in the toughened biocomposites can increase the HDT of the materials [37, 38]. Therefore, different kinds of fillers are used in the present examples to increase the HDT of the materials. On the other hand, by compounding binary blends with high contents PBS, super-toughened composites with high HDT were fabricated in the present invention, which is not reported in previous studies.

Avoiding the formation of gel (high MFI) of the high performance blends with high impact toughness in the in-situ reactive extrusion is important and difficult to realize [39]. In this invention, a new method is applied to achieve the target. In-situ degraded polymer chains (PHBV used here as an example) in the presence of peroxide is used here to increase the MFI of the super-toughened binary or ternary blends, which is not reported in previous studies.

The packaging industry has occupied 38% of the global plastic market for its wide application in our daily life [40]. The barrier properties are very important for the packaging applications, and now prominent petrol-based plastic used in the packaging industry include polyethylene (PE), polypropylene (PP), polyethylene terephthalate (PET) and polystyrene (PS) for their good water or oxygen barrier properties [41]. However, the barrier properties of biobased/biodegradable polymers are typically low. Although the barriers can be improved via the introduction of nanoclays [42], they still fare poorer than the above petrol-based plastics. Therefore, different kinds of fillers are used in the present examples to increase the barrier properties of the materials. Benefiting from the super-toughness and high melt strength of the binary/ternary matrix, toughen composites with high contents talc with high barrier properties were fabricated in the present invention, which is not reported in previous studies.

US20180127554 describes using an anhydride grafted compatibilizer to improve the properties of the biodegradable polymer blends via a two-step processing.

Nano-blends are researched by many institutes and draw a wide interest of the researches because the nano structure blending can create super tough materials with high thermo-mechanical properties [43]. Normally, it is almost impossible to fabricate the nano-blends in a customary blending. The most common approaches used to obtain nanostructure blends are reactive blending [44], block copolymerization [45] and high shear processing [46]. In this invention, we y fabricated the nano-blends by using a small amount of free radical initiator in an extruder, which was not reported anywhere else.

What is needed is a super-toughened fully biodegradable composition with balanced stiffness—toughness—HDT properties. To the best of our knowledge, no such composition has been reported in the previous researches.

SUMMARY OF THE INVENTION

The present invention relates to a novel class of highly compatibilized biodegradable blends and biodegradable composites for industrial applications, exhibiting high impact, high melt strength and stiffness-toughness balance, or a balance combination of high impact and HDT based polymer blends and their biocomposites. In one aspect, the composite formulation is designed to exhibit super-tough impact strength to replace the traditional petrol-based polymers in applications like injection molding samples. In another aspect, the composite formulation is designed to exhibit high melt strength to replace the traditional petrol-based polymers in some special applications like stretch shaping samples. Also, the present invention relates to a novel method of fabricating biodegradable nano-blends directly in a screw extruder.

The composites of the present invention utilize one-step in-situ compatibilization technology (reactive extrusion) to fabricate highly compatibilized polymer blends of two or more biodegradable polymers. The invention also relates to the reactive extrusion to control the melt flow index (MFI) of varying novel formulations. Thus, accordingly the desired formulations can be used either in injection molded, blow molding, blown film or thermoforming type of molded products.

As such, in one embodiment, the present invention provides for a nano-blend of two or more biopolymers comprising a nanostructured first biopolymer in a matrix of a second biopolymer.

In one embodiment of the nano-blend of the present invention, the first biopolymer is polybutyrate adipate terephthalate (PBAT), and the second polymer is polybutylene succinate (PBS).

In another embodiment of the nano-blend of the present invention, the first biopolymer is polybutylene succinate (PBS), and the second polymer is polybutyrate adipate terephthalate (PBAT).

In another embodiment of the nano-blend of the present invention, the nanostructured first polymer is 100 nm or less in diameter.

In another embodiment of the nano-blend of the present invention, the nano-blend further includes polylactic acid (PLA).

In another embodiment of the nano-blend of the present invention, the nano-blend comprises 60% wt. or less of PLA.

In another embodiment of the nano-blend of the present invention, the nano-blend further includes poly(3-hydroxybutyrate-co-3-hydroxyvalerate) (PHBV).

In another embodiment of the nano-blend of the present invention, the nano-blend comprises 25% wt. or less of PHBV.

In another embodiment of the nano-blend of the present invention, the nano-blend comprises 25% wt. or less of PBAT.

In another embodiment of the nano-blend of the present invention, the nano-blend comprises 0.75 phr or less of a free radical initiator.

In another embodiment of the nano-blend of the present invention, the free radical initiator is selected from dibenzoyl peroxide, benzoyl peroxide, dicumyl peroxide, hydroperoxides and ketone peroxides.

In another embodiment of the nano-blend of the present invention, the nano-blend is a high melt flow biodegradable composite.

In another embodiment of the nano-blend of the present invention, the nano-blend is free of a functional monomer.

In another embodiment of the nano-blend of the present invention, the nano-blend is free of any gel content.

In one embodiment, the present application provides for a biodegradable composite. In one embodiment, the biodegradable composite of the present invention includes a nano-blend according to an embodiment of the present invention and one or more fillers.

In another embodiment of the biodegradable composite of the present invention, the composite comprises up to 60% by weight of the filler.

In another embodiment of the biodegradable composite of the present invention, the one or more fillers is selected from the group consisting: natural fibers from perennial grasses, cellulose and agricultural residues; inorganic mineral fillers; carbon fibers; by-products (biomass fillers) from coffee, tea and other agricultural products; and a combination thereof.

In another embodiment of the biodegradable composite of the present invention, the perennial grasses include one or a combination of two or more of *Miscanthus*, switchgrass and bamboo.

In another embodiment of the biodegradable composite of the present invention, the inorganic fillers include one or a combination of two or more of talc, clay and glass fiber.

In another embodiment of the biodegradable composite of the present invention, the biodegradable composite is in the form of a pellet, a granule, an extruded solid, an injection molding solid, a hard foam, a sheet, a film, a dough or a melt.

In another embodiment of the biodegradable composite of the present invention, the biodegradable composite is compostable.

In another embodiment, the present invention provides for an article or product of manufacture including the biodegradable composite according to an embodiment of the present invention.

In one embodiment, the present invention provides for an in-situ method of manufacturing a nano-blend of two or more biodegradable polymers having a nanostructured first biodegradable polymer in a matrix of a second biodegradable polymer, the in-situ method, in one embodiment, includes melting the first and the second biodegradable polymers in the presence of an amount of a free radical initiator, thereby manufacturing the nano-blend.

In one embodiment, the present invention provides for an in-situ method of manufacturing a nano-blend of two or more biodegradable polymers having a nanostructured first biodegradable polymer in a matrix of a second biodegradable polymer, the in-situ method, in one embodiment, consists essentially of, or consists of, melting the first and the second biodegradable polymers in the presence of an amount of a free radical initiator, thereby manufacturing the nano-blend.

In one embodiment of the in-situ method of the present invention the amount free radical initiator is 0.75 phr or less.

In another embodiment of the in-situ method of the present invention the two or more biodegradable polymers are selected from: Poly lactide (PLA), poly(butylene succinate) (PBS), poly(butylene adipate-co-terephthalate) (PBAT), and polycaprolactone (PCL) and polyhydroxyalkanoate (PHA(s)), poly(3-hydroxy)butyrate (PHB) and poly (3-hydroxybutyrate-hydroxyvalerate) (PHBV).

In another embodiment of the in-situ method of the present invention the two or more biodegradable polymers are polybutylene succinate (PBS) and polybutyrate adipate terephthalate (PBAT).

In another embodiment of the in-situ method of the present invention the free radical initiator is dibenzoyl peroxide, benzoyl peroxide, dicumyl peroxide, hydroperoxides, ketone peroxides or a combination thereof.

In one embodiment, the present invention provides for a method of manufacturing a biodegradable composite, the method, in one embodiment, includes: (a) manufacturing a nano-blend using the in situ method according to any embodiment of the present invention; and (b) adding a filler to the nano-blend, thereby manufacturing the biodegradable composite.

In one embodiment of the method of manufacturing a biodegradable composite of the present invention, the filler is selected from one or a combination of two or more of the following: natural fibers from perennial grasses, cellulose and agricultural residues; inorganic mineral fillers from talc or clay; glass fibers or carbon fibers fillers; by-products (biomass fillers) from coffee, tea and other agricultural products.

BRIEF DESCRIPTION OF THE DRAWINGS

The following figures illustrate various aspects and preferred and alternative embodiments of the present invention.

FIG. 6A: nano dispersion of PBAT in the PBS of PBS95-PBAT5-Luperox 0.02 binary blend according to one aspect of the present; FIG. 6B dispersion of PBAT in the PBS of the binary blend of PBS95-PBAT5 with no free radical initiator, showing no nano-blend dispersion; FIG. 6C dispersion of PBAT in the PLA/PBS/PBAT/Luperox 0.75, showing no nano-dispersion.

DESCRIPTION OF THE INVENTION

Definitions

Figure 1:
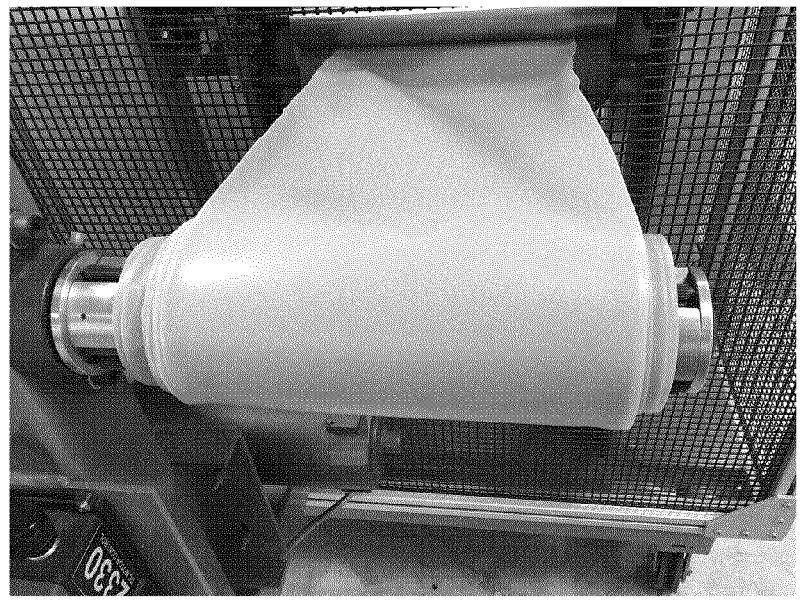
FIG. 1 Three-roll calendaring sheet made of a binary composite with fillers of the present invention.

The following definitions, unless otherwise stated, apply to all aspects and embodiments of the present application. Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "include without limitation"). "Consisting essentially of" shall mean that the blends, composites, articles and methods of the present invention include the recited elements and exclude other elements of essential significance to the combination for the stated purpose. Thus, a blend, composite, article or method consisting essentially of the elements as defined herein would not exclude other materials or steps that do not materially affect the basic and novel characteristic(s) of the claimed invention. "Consisting of" shall mean that the blends, composites, articles and methods of the present invention include the recited elements and exclude anything more than a trivial or inconsequential element or step. Embodiments defined by each of these transitional terms are within the scope of this disclosure.

Singular forms included in the claims such as "a", "an" and "the" include the plural reference unless expressly stated otherwise. All relevant reference, including patents, patent applications, government publications, government regulations, and academic literature are hereinafter detailed and incorporated by reference in their entireties.

The term "plurality," as used herein, is defined as two or more than two. The term "another," as used herein, is defined as at least a second or more. The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "substantially" includes exactly the term it modifies and slight variations therefrom.

The term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab and the variation inherent in the analytical method. Whether or not modified by about, the amounts include equivalents to those amounts. Any quantity stated herein and modified by "about" can also be employed in the present invention as the amount not modified by about The prefix "bio-" is used in this document to designate a material that has been derived from a renewable resource.

The term "renewable resource" refers to a resource that is produced by a natural process at a rate comparable to its rate of consumption (e.g., within a 100 year time frame). The resource can be replenished naturally, or via agricultural techniques.

The term "biobased content" refers to the percent by weight of a material that is composed of biological products or renewable agricultural materials or forestry materials or an intermediate feedstock.

The term "biodegradable" refers to a composite or product capable of being broken down (e.g. metabolized and/or hydrolyzed) by the action of naturally occurring microorganisms, such as fungi and bacteria.

The term "compostable" refers to a composite or product that satisfies requirement, set by ASTM D6400, for aerobic composting in municipal and industrial facilities. In a brief note, a compostable material fulfilling ASTM D6400 requirements is substantially broken down in compost at a rate that is consistent with known compostable materials (e.g. cellulose), disintegrates into small pieces and leaves no toxic residue.

The term "hybrid composite/biocomposites" refers to the composite/biocomposites including any combination of two or more types of different biomass.

The term "highly compatibilized composites" refers to a composite in which no phase separation can be observed in micro-scale by micro technique such as scan electrical microscopy (SEM) or optical microscopy (OM) technology. In some case nano-scale dispersed phase can be found in the highly compatibilized composites.

The term "super-tough" refers to a composite with notched impact strength higher than 530 J/m in standard ASTM D256 testing.

The term "miscibility" refers to thermodynamically miscible; each mixture is characterized by a single thermal transition as well as a single amorphous phase.

The term "nano-blends" or "nano-structure" refers to a dispersed polymeric phase in a blend system having domains or dispersed particles below 100 nm in diameter.

Figure 6:
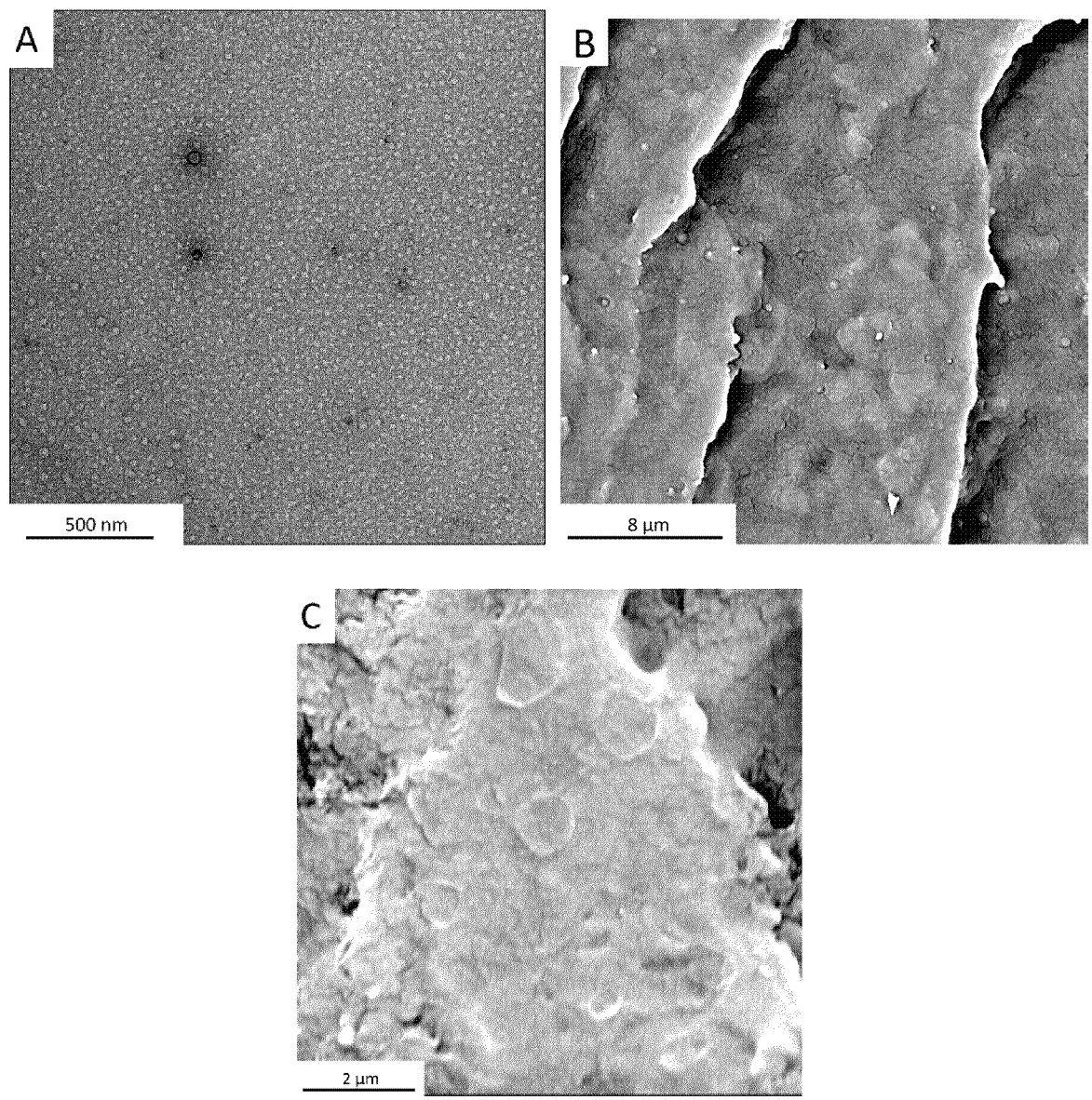
FIGS. 6A-6C: Electron microscope image of different blends.

Reference herein to the terms "homogeneous blend" or "homogeneous nano-blend" are to be understood to refer to blends having a uniform mixture wherein the nano-structures or domains in the blend are evenly distributed throughout the whole blend. FIG. 6A is a non-limiting example illustrating a homogeneous blend or nano-blend having a uniform nano dispersion of PBAT in the PBS of a PBS95-PBAT5-Luperox 0.02 binary blend according to one aspect of the present.

The term "melt strength" refers to the resistance of the polymer melt to stretching, which influence drawdown and sag from the die to the rolls in polymer processing.

The term "MFI" refers to the melt flow index of the polymer blends or composites, which influence the flowability of the materials in polymer processing.

The term "barrier" refers to the properties seal the contents (Oxygen, nitrogen, carbon dioxide, water vapor, and other gases in the air) from outside factors and protect the products (food, beverage, et al.) to prevent degradation in quality, which is important for the packaging materials.

The term "stretch shaping" refers to the stretch or extensional flow-based shaping operations take place downstream from the die, such as melt fiber spinning, tubular film blowing, blow molding and thermoforming.

The term "free radical initiator" refers to substances that can produce radical species under mild conditions and promote radical reactions. Non-limiting examples of "free radical initiators" that can be used in the present invention include: dibenzoyl peroxide, benzoyl peroxide and dicumyl peroxide, including but not limited to: 2,5-dimethyl-2,5-di(t-butylperoxy) 3-hexyne; 2,5-dimethyl-2,5-di(t-butylperoxy) hexane; 2,5-dimethyl-2,5-di(t-amylperoxy) hexane; 4-(t-butylperoxy)-4-methyl-2-pentanol; Bis(t~butylperoxyisopropyl)benzene; Dicumyl peroxide; Ethyl 3,3-bis(t-butylperoxy) butyrate; Ethyl 3,3-bis(t-amylperoxy) butyrate; and, Dibenzoyl peroxide.

The term "gel" refers to crosslinked blends or composites which cannot be dissolved in an organic solvent.

The term "wt. %" refers to the weight percent of a component in the composite formulation with respect to the weight of the whole composite formulation.

The term "about" modifying any amount refers to the variation in that amount encountered in real world conditions of producing materials such as polymers or composite materials, e.g., in the lab, pilot plant, production facility. Whether or not modified by about, the amounts include equivalents to those amounts. Any quantity stated herein and modified by "about" can also be employed in the present invention as the amount not modified by about.

Overview

Henceforth, this document provides detailed description of the embodiments of the present invention. The present invention provides binary blends and ternary blends having super toughened properties using relatively small amounts of peroxide. The binary and ternary blends of the present invention provide the opportunity to add fillers that contribute to lower the costs of the composites, increase the MFI and HDT of the composite without much sacrificing the impact strength and water/oxygen barrier properties.

For the first time, gel free samples with high performance (like high impact strength, high melt strength) were achieved in the present invention via dispersing one phase into nano-scale in the presence of small amount of free radical initiators.

Different from US20180127554, which uses an anhydride grafted compatibilizer to improve the properties of the biodegradable polymer blends via a two-step processing, the present invention does not need any compatibilizer. A free radical initiator is added into the polymer blends directly via one-step process (i.e. a one step in situ method), to improve the compatibility of the blends via in-situ free radical reactions resulting in a nano-blend. The active reactions between the free radical initiator and different kinds of biodegradable polymers endow the binary, ternary or quaternary blends high compatibility and super toughness. And for binary blends of PBS and PBAT, for the first time, nano-structures can be found in the blends of the present invention.

In one embodiment, the present invention provides a composition, method or manufacture of biocomposites which may be based on the in-situ reactive extrusion via one-step (single step) process in the presence of free radical initiators, with addition of fillers based on perennial grasses (including but not limited to *Miscanthus* fibers), and/or agricultural residues (including but not limited agricultural straws) and/or mineral fillers (including but not limited to talc), and/or fibers (including but not limited to glass fibers), or with addition of a second biodegradable polymers (including but not limited to PBS, PLA, PHBV), and/or biobased plasticizers (including but not limited to soy oil, soy wax), and/or biodegradable oligomer (including but not limited to low polymerization degree poly (Lactide acid) (low DP poly (lactide acid)) or low molecular weight polyethylene glycol (PEG)). A biodegradable matrix composed of biodegradable thermoplastics which may be reinforced or not with the above fillers and which may be produced by reactive extrusion suitable for general purpose application such as food containers and the like. Conventional extrusion, injection molding and/or thermoforming, normally used in the synthetic plastic industries, may also be used in the method of processing.

The biocomposites of the present invention may exhibit properties typical of plastic materials, and/or properties advantageous compared to aggregates including plastic and, for example, wood or cellulosic materials.

The biocomposites of the present invention may be formed into useful articles using any of a variety of conventional methods for forming items from plastic. The present biocomposites may take any of a variety of forms.

Biocomposites and Method of Manufacturing

The present invention relates to a new and non-obvious material formulations based on biodegradable polymeric matrix in the presence of free radical initiators. This invention could enable tailor highly compatibilized blends and composites by using an amount of a free radical initiator that does not result in the formation of gel or that results in the formation of small amounts of gel (5.4 gel content or less). The free radical initiator could be used in an amount of 0.75 phr or any amount under 0.75 phr, such as 0.5 phr or less, 0.3 phr or less, 0.05 phr or less. In one particular embodiment of the present invention, a nano-blend is fabricated with a small amount of peroxide as low as 0.02 phr. Also, the present invention is about development and production methods of new biocomposites based the mentioned polymeric matrix with different kinds of fillers (including but not limited to *Miscanthus* fibers, talc, clay, glass fibers). Also, the present invention is about development and production methods of new biodegradable blends based the above mentioned polymeric matrix with different kinds of second biopolymers (including but not limited to PLA, PHBV and PBS). The present invention has distinguished points compared to the prior art in both aspects of material properties and production method.

i. Biodegradability: The biocomposites of the present invention may be formulated in such a way that the final manufactured product would have end of life biodegradability (compostability) characteristic. To develop such biocomposites, the proposed formulation may include a polymeric matrix from biodegradable plastics, including but not limited to Poly lactide (PLA), poly(butylene succinate) (PBS), poly(butylene adipate-co-terephthalate) (PBAT), and polycaprolactone (PCL) and polyhydroxyalkanoate (PHA(s)), poly(3-hydroxy)butyrate (PHB) and poly(3-hydroxybutyrate-hydroxyvalerate) (PHBV).

ii. Renewability: The polymer blends used in the present invention may be produced, at least in part, from renewable resources. Thus, considering the renewability of the filler also the final formulation can be produced from renewable materials higher than 50% by weight of the whole composites.

iii. Free radical reaction: A free-radical reaction is any chemical reaction involving free radicals. In organic reactions, the radicals are often generated from radical initiators such as peroxides.

iv. Binary, ternary or quaternary blends with tailored properties: the developed formulation of the present invention includes a polymeric matrix blend which may include a combination of any two or more biodegradable polyesters including but not limited to Poly lactide (PLA), poly(butylene succinate) (PBS), poly(butylene adipate-co-terephthalate) (PBAT), and polycaprolactone (PCL) and polyhydroxyalkanoate (PHA(s)), poly(3-hydroxy)butyrate (PHB) and poly(3-hydroxybutyrate-hydroxyvalerate) (PHBV). Blending may benefit from the specific merits of each moiety in order to balance different properties. To create such a balance, the following aspects may be considered simultaneously: rigidity/modulus (PHAs, PHBV and PLA), strength (PLA and PBS), impact strength (PBAT and PCL), elongation (PBS, PBAT and PCL), heat deflection temperature (PHAs, PBS, PHB, PHBV), renewable resource based (PHAs, PLA and PBS), good flowability (PHB, PHBV) and low cost (PLA).

v. Highly compatibilized composites. Based on the targeted application with specific requirements, in the present invention, a convenient method of producing highly compatibilized composites has been utilized. In the presence of free radical initiators, a binary or ternary blend of biodegradable polyesters such as PLA, PBS, and PBAT are highly compatibilized without gel formation via in-situ reactive extrusion with achieving super high impact. The developing of such compatibilization technology provides opportunities in tailoring the properties (such as melt flow index, rheological and impact strength) of the composites made therefor.

vi. Free of gel formation. In the present invention, super toughened biodegradable polymer blends without any gel content have been prepared by one-step extrusion in the presence of small amount of free radical initiator.

vii. Nano-blends: As illustrated in FIG. 6A, the blends of the present invention are characterized by being nano-blends in which the size of one polymeric phase is below 100 nm.

viii. High barrier polymeric composites: In the present invention, super toughened biodegradable composites with high filler loadings has been prepared by one-step extrusion. The target is to achieve high barrier properties for packaging applications. The developing of such compatibilization technology provides opportunities in making high barrier composites with good mechanical properties (toughness, stiffness) made therefor.

In order to aid in the understanding and preparation of the present invention, the following illustrative, non-limiting examples are provided.

EXAMPLES

Materials

Table 2 includes a list of materials or ingredients that can be used to produce the novel formulations of the present invention.

The polymeric matrix of the biocomposites of the present invention includes renewable resource derived polymers such as PLA or the alike, biodegradable polymers such as PBAT. It may include other biodegradable polymers such as PBS, PHAs, PCL.

The free radical initiator of the present invention includes different peroxides, dibenzoyl peroxide, benzoyl peroxide and dicumyl peroxide or the alike.

TABLE 2

Materials that can be used to produce the novel formulations proposed in this invention

| Material | Examples | Role |
| --- | --- | --- |
| Biodegradable Polymers | PLA, PBS, PBAT, PCL, PHAs, PHBV and alike | Matrix |
| Perennial Grasses | Miscanthus, Switchgrass, bamboo and the like | Filler/Reinforcing agent |
| Inorganic fillers | Talc, Clay, Calcium carbonate, glass fibers and the like | Filler/Reinforcing agent |
| By-products of agricultural products | Coffee chaff, spent tea leaves, grape pomace, oat hull and the like | Filler/Reinforcing agent |
| Peroxide-based chemicals | dibenzoyl peroxide, benzoyl peroxide, dicumyl peroxide, hydroperoxides, Ketone peroxides and the like | Free radical initiator |

The poly (lactic acid) or polylactide, both indicated as PLA in this application, can be produced by condensation polymerization of lactic acid or ring opening polymerization of lactide, respectively. Usually, the lactide can be synthesized by a chemical method using a fossil resource such as petroleum or natural gas. However, lactic acid produced by fermentation of sugars from starch, molasses or the like may be preferred and used in the present invention. The PLA can be high or low melt flow index with high tension modulus (about 4.5 GPa), tension strength (about 65 MPa), low elongation at break (about 3%) and low impact strength (about 25 J/m).

The poly (butylene adipate-co-terephthalate) (PBAT) is a petroleum based aliphatic-aromatic biodegradable copolymer randomly polymerized from the polycondensation of 1,4-butanediol. It has high elongation at break of ~700%, high impact strength showing non-break and low tension modulus and strength.

The poly (butylene succinate) (PBS), synthesized by condensation polymerization of succinic acid and butanediol, is a biodegradable polymer. The source of production of PBS can be synthesized from either fossil resource or biological resources, the latter usually labeled as "BIOPBS". PBS has high elongation at break of 350%, tension modulus of ~750 MPa, high HDT values of ~90° C. but low impact strength of ~30 J/m.

Polyhydroxyalkanoates or PHAs are linear polyesters produced in nature by bacterial fermentation of sugar or lipids. They are produced by the bacteria and store carbon and energy. PHAs are a very versatile family in which different members possess different properties, stiff or tough, crystalline or amorphous. More important is that all members of the PHA family are biodegradable. Both PHB and PHBV are members of the PHAs family, the former is homopolymer while the latter is copolymer.

Perennial grasses are typical lignocellulosic biomass and promising non-food crop with high yield, low cost, soil remediation potential and carbon dioxide balance in environment. The advantage of using perennial grasses in this application is their good reinforcement of modulus properties and increased HDT, as well as the strong potential for a reliable supply chain.

The free radical initiators consist of organic peroxide group with different chemical structures. The peroxide may be in the form of peroxide, hydroperoxides, peroxy esters and ketone peroxide, including but not limited to 2,5-dimethyl-2,5-di(t-butylperoxy) 3-hexyne; 2,5-dimethyl-2,5-di(t-butylperoxy) hexane; 2,5-dimethyl-2,5-di(t-amylperoxy) hexane; 4-(t-butylperoxy)-4-methyl-2-pentanol; Bis(t-butylperoxyisopropyl)benzene; Dicumyl peroxide; Ethyl 3,3-bis(t-butylperoxy) butyrate; Ethyl 3,3-bis(t-amylperoxy) butyrate; and, Dibenzoyl peroxide.

Methods

The compositions produced by the following method can be used for general purposes including but not limited to plastic containers as well as degradable and disposable items such as flower pots, food and coffee trays, horticultural trays, storage bins, disposable consumer products, food packaging, single use containers, parts, tool boxes, bathroom accessories, dust pans, spray guns and the like.

Production of In-Situ Reaction Extruded Composites Based on Binary/Ternary Blends Prior to melt processing, all polyesters were dried in the oven at 80° C. for at least 12 hr. The methods related to an in-situ reactive extrusion are performed in presence of a free radical initiator. The free radical initiator used in the following example is 2,5-Bis(tert-butylperoxy)-2,5-dimethyl-hexane, also known as 2,5-Bis(tert-butylperoxy)-2,5-dimethylhexane or Luperox 101. Other free radical initiator, including linear peroxide, cyclic organic peroxide, benzoyl peroxide, dicumyl peroxide or the like, can also be used in this application.

Figure 2:
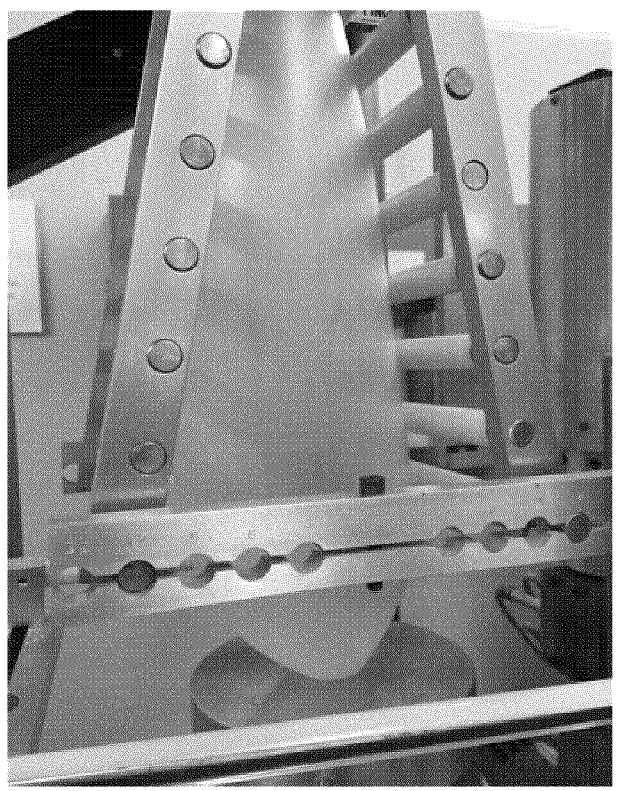
FIG. 2 Blown film of the compatibilized binary blends with talc according to one aspect of the present invention.

The in-situ reaction of the binary/ternary biopolymer blends in the presence of free radical initiator can be performed on Haake mixers or the like, micro-compounders with integrated extrusion and injection molding systems (i.e. DSM micro injection molding), or in any extrude and injection molding systems normally used to process thermoplastics. When an extruder is used, which is a preferred method of processing, strands are produced in a continues process which can be pelletized and further processed by other process method such as injection molding, three roll calendaring (see FIG. 1), film blowing (FIG. 2) or the like. The use of twin-screw extruder systems is determinant in the production of inexpensive materials and it is a rapid way to obtain mass commercially valuable polymers.

The twin-screw extruder in the presented work is a corotating twin screw extruder (Leistritz Micro-27, Germany) with a screw diameter of 27 mm and an L/D ratio of 48. This extruder may present 10 heating zones or less. It required degassing pump when the reactive extrusion is performed. It may require two feed barrel zones by which indistinctly the polymers and the fillers/reinforcing agents are fed. The main feed speed and the side stuffer feed speed should be matched to ensure the composition ratio between the polymer and fillers.

The temperatures of processing may vary from 120 to 250° C., or any range between 120 and 250° C. The processing conditions are listed in Table 3.

TABLE 3

Extrusion parameters and additive concentrations used for fabrication of in-situ compatibilized composites

| Parameters | Conditions |
| --- | --- |
| Processing temperature | 120 to 250° C. |
| Screw Speed | 20-150 rpm |
| Residence time | 0.2-10 min |
| Filler/Reinforcing Agent | 0.01-60 wt % |
| Free Radical Initiator | 0.0001-15 phr |

The in-situ reaction is prepared through (1) pre-mixing one or more biodegradable polymers and a free radical initiator; (2) melting step (1) thereby manufacturing the highly compatibilized biodegradable matrix. In the present application, the continuous processing was conducted in a twin screw extruder manufactured by Leistritz, Germany. The melt mixing process can be performed in other process equipment including, but not limited, Hakke mixer, single screw extrude or micro-compounders like DSM using the parameter in Table 3.

Unreacted or excess free radical initiator and other small molecular by-product can be purified by the following method: 1) Devolatilization—applying vacuum to vent off volatile during extrusion process; 2) drying the synthesized matrix under vacuum at 95° C. until the desired level of un reacted free radical initiator in the matrix is reached.

Sample Preparation and Characterization

Figure 3:
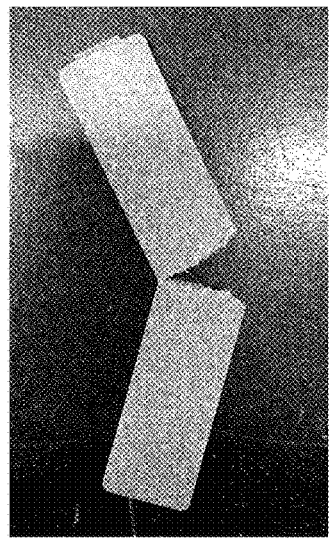
FIG. 3 Impact samples from injection molded part made of a ternary matrix with 20 wt % fillers (*Miscanthus* fibers) according to one aspect of the present invention.
Figure 4:
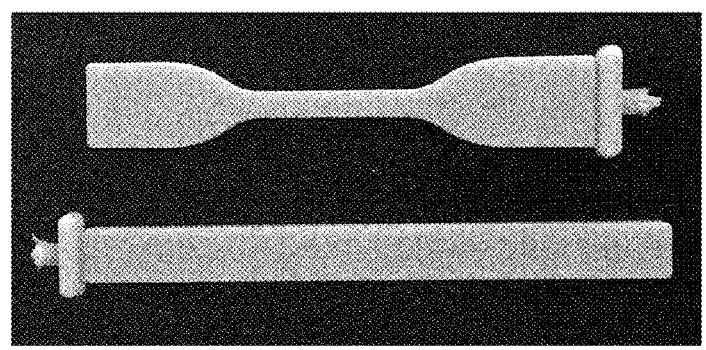
FIG. 4 Injection molded part made of a binary matrix with a second biodegradable polymer (PHBV) according to one aspect of the present invention.
Figure 5:
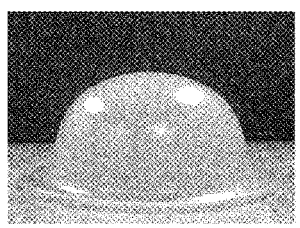
FIG. 5 Thermoformed products or articles made of a compatibilized binary composite and the composites with 20 wt % fillers (*Miscanthus* fibers and talc) according to aspects of the present invention.
Figure 5:
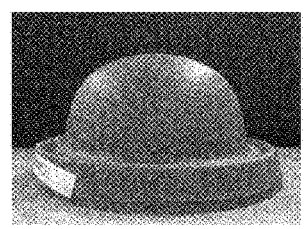
Figure 5:
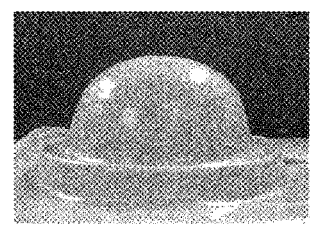

The extruder pellets can be shaped into desired geometry by any conventional polymer processing technique including but not limited to injection molding (see FIGS. 3 and 4), compression molding, three-roll calendaring (see FIG. 1), film blowing (see FIG. 2) and vacuum thermoforming (see FIG. 5).

In the examples provided in this application, tensile, flexural and impact test bars are manufactured from the pellets by using a micro-injection molding instrument of DSM Explore, Netherlands. The extruded pellets were melted in a micro-compounder followed by immediate injection in a micro-injector both manufactured by DSM explore, the Netherlands, in the melting temperature range from 120-250° C., molding temperature from 30-80° C.

Specimens to measure the tensile and flexural properties as well as impact strength are produced and tested according to the following standards ASTM: D638 (standard test method for tensile properties of plastics), D790 (standard test method for flexure properties of reinforced and unreinforced plastics and electrical insulating materials), D256 (notched izod; standard test method for determining the Izod pendulum impact resistance of plastics). The heat deflection temperature is measured using a dynamic mechanical analyzer (DMA) from TA, USA with sample bars of 3.3×2.7×60 mm$^3$ in a 3-point bending mode, temperature ramp rate of 2° C./min and loading force of 0.455 MPa according to the ASTM D648. The gel contents of the blends are calculated by the dissolve-extraction method according to ASTM D2765. The polymer is sealed in stainless steel wire mesh and dissolved in chloroform for 24 h. After extraction, the undissolved parts are transferred into a vacuum oven at 40° C. for 3 days to remove the chloroform. The residue of the insoluble polymer is weighted and reported as wt 0 gel content. The oxygen and water barrier properties of the plastic samples is measured using a Mocon permeation instrument (OX-Tran Model 2/21L and Permatran-W Model 2/21L, Ameter Mocon, Ltd, USA) according to the ASTM D1434 and ASTM D697.

Results

In-Situ Compatibilized Composites Based on Binary/Ternary/Quaternary Blends

Composites Based on a Binary Blend Matrix

The effect of the composition ratio and compatibilization via the one-step reactive extrusion on the properties of the binary composites is presented in Table 4.

high impact strength of PBS/PBAT/Luperox blends with low amount of PBAT is ascribed to the formation of nanostructure in the high compatibility system, as shown in FIG. 6A. In PBS/PBAT blend with 0.02 phr of peroxide we could achieve an increase of % elongation at yield by almost two times from 14.5 to 27.5%. By using such small amount of peroxide, the gel contents of the blends can be controlled to 0. More notably such gel free compatibilized blend in presence of 20% *Miscanthus* fiber/Talc made most innovative biodegradable composites. With such 20% filler contents we still found % elongation yield of 9% and 18% which are not usual in composite materials. Again, such

TABLE 4

PBS/PBAT binary blends and their composites

| Samples Matrix Composition (wt %) | Luperox contents (phr) | Tension Modulus (MPa) | Tension Strength (MPa) | Elongation at Yield (%) | Elongation at break (%) | Flexure Modulus (MPa) | Flexure strength (MPa) | Impact strength (J/m) | HDT (° C.) |
|---|---|---|---|---|---|---|---|---|---|
| PLA 100 | 0 | 4510 ± 354.9 | 74.9 ± 8.65 | — | 2.72 ± 0.35 | 3114 ± 22 | 106 ± 0.84 | 32.862 ± 1.301 | 55 |
| PBS 100 | | 613 ± 23.18 | 48.7 ± 2.36 | 17.91 ± 0.38 | 267.3 ± 24.5 | 351 ± 2.8 | 16.2 ± 0.1 | 79 ± 28.834 | 88 |
| PBAT 100 | | 70 ± 7.5 | 27.6 ± 1.97 | 559.5 ± 56.0 | 574.4 ± 53.3 | 53 ± 2 | 2.54 ± 0.1 | Non-break | 45 |
| PBS 80 PBAT 20 | 0 | 457 (33.5) | 47.4 (4.43) | 14.5 (0.43) | 372.96 (12.45) | 449 (1.66) | 20.10 (0.07) | 243.725 (163.079) | 83.69 |
| | 0.02 | 460 (12.64) | 47.3 (0.75) | 27.17 (0.17) | 146.07 (6.82) | 379 (6.8) | 16.36 (0.28) | 689.233 (47.989) | 82.5 |
| COMPOSITES (Filler Effect) | | | | | | | | | |
| PBS80/PBAT20-L0.02/ 20 wt % Miscanthus Fiber | | 1314 (64.77) | 31.7 (1.07) | 9.35 (0.14) | 23.46 (2.86) | 1016 (87.9) | 33.46 (0.83) | 168.704 (4.9) | 96.61 |
| PBS80/PBAT20-L0.02/ 20 wt % Talc | | 1316 (64.54) | 42.5 (0.21) | 18.14 (0.17) | 33.17 (1.38) | 1152 (34.1) | 35.16 (0.71) | 160.643 (10.04) | 97.07 |

TABLE 5

PBS/PBAT binary blends with Different PBAT contents

| Samples | Modulus (Young's) (MPa) | Tension Strength break(MPa) | Elongation at Yield (%) | Elongation at break (%) | Flexure Modulus (MPa) | Flexure Strength (MPa) | Impact strength (J/m) | HDT (° C.) | MFI (g/10 min) 210° C., 7.16 kg |
|---|---|---|---|---|---|---|---|---|---|
| PBS 95/PBAT5 Luperox 0.02 | 705 (41.02) | 52.4 (1.07) | 21.15 (0.34) | 137.68 (12.52) | 724 (10.65) | 29.35 (0.24) | 504.92 (59.88) | 81.31 | 0.35 |
| PBS 90/PBAT10/ Luperox 0.02 | 593 (19.79) | 53.9 (1.23) | 21.90 (0.07) | 139.71 (10.09) | 639 (10.07) | 26.0 (0.41) | 580.403 (156.2) | 82.95 | 0.23 |
| PBS 85/PBAT15/ Luperox 0.02 | 520 (48.97) | 48.2 (1.55) | 21.75 (0.33) | 168.16 (13.16) | 527 (49.33) | 21.9 (1.39) | 718.483 (55.141) | 81.48 | 0.20 |
| PBS 80/PBAT20/ Luperox 0.02 | 460 (12.64) | 47.3 (0.75) | 27.17 (0.17) | 146.07 (6.82) | 379 (6.8) | 16.36 (0.28) | 689.233 (47.989) | 82.5 | 0.16 |

The binary blends presented in these examples are based on a combination of a relatively tough polymer (PBS in this case) and another tough polymer with high impact strength (PBAT in this case) biodegradable polymers. The matrix can also be selected from other biodegradable polymers but not limited to PHAs, PCL, Polyglycolide (PGA), et al. Each biodegradable polymer may vary in the range of 0.01 to 99 wt %0 by weight of the whole composites, more preferably in the range of 0.01 to 20 wt % of PBAT to remain the high bio-contents of the composites.

As shown in tables 4 and 5, the increase of the tough polymer portion in the matrix can increase the impact strength of the materials remaining high HDT values. The invented biodegradable formulations have tensile modulus of more than 1.3 GPa and HDT values nearer to 100° C. Such biodegradable formulations would find varying industrial uses. However, in such formulation, the free radical initiator can be selected from the ones listed in Table 2, in the range of 0.0001 phr-15 phr by weight of the whole composites. And the filler/reinforcing agent can also be selected, but not limited to, from the ones listed in Table 2, in the range of 0.01 to 60 wt %.

Composites Based on a Ternary/Quaternary Blend Matrix

The effect of the composition ratio and compatibilization via the one-step reactive extrusion on the properties of the ternary composites is presented in Table 6.

TABLE 6

PLA/PBS/PBAT ternary blends and their composites

| Matrix Composition (wt %) | Luperox contents (phr) | Tension Modulus (MPa) | Tension Strength (MPa) | Elongation at Yield (%) | Elongation at break (%) | Flexure Modulus (MPa) | Flexure strength (MPa) | Impact strength (J/m) | HDT (° C.) |
|---|---|---|---|---|---|---|---|---|---|
| PLA 100 | 0 | 4510 ± 354.9 | 74.9 ± 8.65 | — | 2.72 ± 0.35 | 3114 ± 22 | 106 ± 0.84 | 32.862 ± 1.301 | 55 |
| PBS 100 | | 613 ± 23.18 | 48.7 ± 2.36 | 17.91 ± 0.38 | 267.3 ± 24.5 | 351 ± 2.8 | 16.2 ± 0.1 | 79 ± 28.834 | 88 |
| PBAT 100 | | 70 ± 7.5 | 27.6 ± 1.97 | 559.5 ± 56.0 | 574.4 ± 53.3 | 53 ± 2 | 2.54 ± 0.1 | Non-break | 45 |
| PLA 80 | 0 | 2799 ± 78.52 | 30.7 ± 2.74 | 2.99 ± 0.17 | 50.89 ± 22.7 | 2722 ± 20 | 83 ± 5.2 | 45.297 ± 3.687 | 50.6 |
| PBS 10 | 0.3 | 2533 ± 268.74 | 31.8 ± 1.08 | 3.08 ± 0.12 | 94.69 ± 7.48 | 2511 ± 11 | 76 ± 1.3 | 37.223 ± 2.61 | 48.9 |
| PBAT 10 | 0.5 | 2958 ± 371.48 | 31.2 ± 1.87 | 2.93 ± 0.1 | 61.32 ± 22.6 | 2340 ± 80 | 72 ± 1.7 | 35.074 ± 4.203 | 49.8 |
| | 0.75 | 3240 ± 333 | 30.9 ± 1.15 | 2.8 ± 0.13 | 43.24 ± 27.3 | 2418 ± 96 | 73 ± 1.7 | 34.235 ± 2.723 | 49.2 |
| PLA 60 | 0 | 2385 ± 607.28 | 32.5 ± 3.26 | 3.15 ± 0.38 | 99.63 ± 9.5 | 2001 ± 44 | 63 ± 1.1 | 78.441 ± 13.809 | 52.6 |
| PBS 20 | 0.02 | 2028 ± 29.52 | 43.4 ± 2.6 | 3.18 ± 0.88 | 155.8 ± 33.2 | 1901 ± 147 | 56.2 ± 1.3 | 524.402 ± 72.856 | 52.6 |
| PBAT 20 | 0.3 | 1965 ± 269.84 | 31.4 ± 0.73 | 3.35 ± 0.15 | 103.47 ± 7.6 | 1751 ± 10 | 56 ± 0.7 | 728.709 ± 22.355 | 48.5 |
| | 0.5 | 1710 ± 160.47 | 30.7 ± 1.52 | 3.77 ± 0.12 | 87.63 ± 3.55 | 1737 ± 13 | 55 ± 0.7 | 915.932 ± 49.96 | 48.7 |
| | 0.75 | 2750 ± 280.02 | 35.9 ± 1.67 | 3.96 ± 0.10 | 56.97 ± 16.8 | 1613 ± 29 | 52 ± 1.9 | 940.886 ± 32.261 | 48.1 |
| PLA 40 | 0 | 1417 ± 180.19 | 33.5 ± 1.95 | 6.78 ± 1.37 | 167.7 ± 12.5 | 1184 ± 49 | 44 ± 1.7 | 111.507 ± 19.686 | 49.4 |
| PBS 40 | 0.02 | 1501 ± 70.3 | 42.7 ± 1.65 | 6.2 ± 0.15 | 168.2 ± 6.19 | 1358 ± 9.1 | 48 ± 0.35 | 996.55 ± 26.06 | 50.7 |
| PBAT 20 | 0.3 | 1309 ± 91.75 | 33.9 ± 1.1 | 14.24 ± 1.15 | 105.7 ± 6.01 | 1218 ± 10 | 42 ± 0.2 | 1003.1 ± 60.532 | 48.5 |
| | 0.5 | 1269 ± 100.07 | 34.4 ± 1.9 | 16.14 ± 1.65 | 85.5 ± 16.44 | 1195 ± 23 | 41 ± 1 | 1014.18 ± 32.873 | 49.1 |
| | 0.75 | 1289 ± 80.4 | 38.1 ± 0.46 | 47.34 ± 8.36 | 48.3 ± 6.18 | 1216 ± 20 | 40 ± 1 | 976.607 ± 52.405 | 51.3 |
| COMPOSITES (Filler Effect) | | | | | | | | | |
| P-S40T20-L0.02/20 wt % Glass Fiber | | 4385 ± 369 | 29.5 ± 5.7 | 3.05 ± 0.09 | 8.48 ± 2.5 | 3336 ± 153 | 71 ± 1.9 | 140.56 ± 11.41 | 78.0 |
| P-S40T20-L0.02/20 wt % Miscanthus Fiber | | 3732 ± 377 | 33.8 ± 0.42 | 3.27 ± 0.55 | 7.84 ± 1.31 | 2099 ± 31 | 51.3 ± 1.5 | 114.85 ± 22.23 | 56.4 |
| P-S40T20-L0.02/20 wt % Talc | | 2762 ± 97 | 37.1 ± 0.49 | 5.25 ± 0.22 | 93.25 ± 34.3 | 2692 ± 213 | 56.3 ± 2.8 | 171.17 ± 30.43 | 54.5 |

The ternary blends presented in these examples are based on a combination of a relatively rigid (PLA in this case) and two relatively tough (PBS and PBAT in this case) biodegradable polymers. The matrix can also be selected from other biodegradable polymers but not limited to PHBV, PHAs, PCL, Polyglycolide (PGA). Each biodegradable polymer may vary in the range of 0.01 to 99 wt % by weight of the whole composites, more preferably in the range of 0.01 to 20 wt % of PBAT to remain the high bio-contents of the composites.

As shown in table 6, the increase of the tough polymer portion in the matrix can improve the elongation as well as the impact strength of the materials with balanced stiffness (modulus higher than 1.2 GPa). In a specific PLA/PBS/PBAT blends with 0.02 phr Luperox peroxide, we find the samples shown high stiffness (~2.0 GPa), high elongation at break (~155%) and high impact strength (~524 J/m).

As shown in Table 6, the addition of free radical initiator (2,5-Bis(tert-butylperoxy)-2,5-dimethylhexane, in this case) in the ternary blends dramatically improved the impact strength of the matrix, fabricating a super-toughened material. In a specific PLA/PBS/PBAT blend with only 0.02 Luperox peroxide we finds as high as 996 J/m notched Izod impact strength. However, in such formulation, the free radical initiator can be selected from the ones listed in Table 2, in the range of 0.0001 phr-15 phr by weight of the whole composites.

Table 6 also shows the effect of fillers in the composites (Glass fiber, Miscanthus fiber and Talc in these cases). The incorporation of appropriate filler can increase the HDT of the materials dramatically (to 78° C. with glass fiber) remaining acceptable impact strength (~140 J/m) and high stiffness (~modulus of 4.3 GPa), fabricating toughness—stiffness—HDT balanced bio-based composites. However, the filler/reinforcing agent can also be selected, but not limited to, from the ones listed in Table 2, in the range of 0.01 to 60 wt %.

TABLE 7

The gel contents and MFI of the PLA/PBS/PBAT/Luperox ternary blends with different Luperox contents

| Sample | Gel Contents | MFI (g/10 min) | MFI Testing condition |
|---|---|---|---|
| Without Luperox 101 | | | |
| P-S10T10 | 0 | 5.45 | 190° C., 2.16 kg |
| P-S20T20 | 0 | 5.0 | |
| P-S40T20 | 0 | 7.98 | |
| With Luperox 101 | | | |
| P-S10T10-L0.3 | 0 | 8.44 | 230° C., 2.16 kg |
| P-S10T10-L0.5 | 1.4 | 4.49 | |
| P-S10T10-L0.75 | 5.4 | NA | |
| P-S20T20-L0.02 | 0 | 2.83 | |
| P-S20T20-L0.3 | 0.6 | 1.12 | |
| P-S20T20-L0.5 | 3.4 | NA | |
| P-S20T20-L0.75 | 9 | NA | |
| P-S40T20-L0.02 | 0 | 1.88 | |
| P-S40T20-L0.3 | 0.9 | 0.65 | |
| P-S40T20-L0.5 | 4.6 | NA | |
| P-S40T20-L0.75 | 17.5 | NA | |

The gel contents and MFI values of the composites can be controlled by the luperox contents, as shown in Table 7. The gel contents are well controlled in our formulation by using small amount of luperox, while keeping high impact strength and high elongation at yield.

TABLE 8

One-step Extruded PBS/PBAT/PHBV ternary blends and their composites

| Samples | Modulus (Young's) (MPa) | Tension Strength break(MPa) | Elongation at Yield (%) | Elongation at break (%) | Flexure Modulus (MPa) | Flexure Strength (MPa) | Impact strength (J/m) | HDT (° C.) | MFI (g/10 min) (190° C., 2.16 kg) |
|---|---|---|---|---|---|---|---|---|---|
| PBS 60 PBAT 20 PHBV 20 L 0.3 phr | 769 (61.6) | 43.1 (2.58) | 18.03 (0.18) | 176.2 (40.6) | 1022 (51.2) | 32.44 (0.84) | 277.4 (107.5) | 82.11 | 15.8 |
| PBS 40 PBAT 20 PHBV 40 L 0.3 phr | 1220 (123.65) | 27.2 (0.4) | 14.24 (0.6) | 89.3 (19.03) | 1446 (17.26) | 29.10 (0.68) | 129.87 (32.65) | 82.2 | 22.24 |

More examples of ternary blends on a combination of PHBV/PBS/PBAT biodegradable polymers and their composites are shown in Table 8. The ternary blend (without filler) with high impact strength, high HDT as well as good flow ability (high MF), exhibits much different properties compared to the PLA/PBS/PBAT/Luperox composites. By controlling the amount of PHBV and Luperox, properties like MFI can be adjusted or tailored. Quaternary blends PLA/PBS/PBAT/PHBV/Luperox with super-toughness and high MFI are also prepared based on the above theory. One example on quaternary blends is given in Table 9. The MFI of the quaternary blends increased from 'not flow' to 13.5 while remaining the acceptable impact strength.

TABLE 9

One-step Extruded PLA/PBS/PBAT/PHBV quaternary blends

| Samples | Modulus (Young's) (MPa) | Strength at break(MPa) | Elongation at Yield (%) | Elongation at break (%) | Impact strength (J/m) | HDT (° C.) | MFI (g/10 min) (190° C., 2.16 kg) |
|---|---|---|---|---|---|---|---|
| 85[PLA60/PBS20/PBAT20]-15PHBV-Luperox 0.3 | 2325 (132.65) | 37.9 (1.38) | 3.61 (0.03) | 91.02 (7.69) | 119.4 (22.85) | 55.0 | 13.5 |

Finally, the improved MFI ternary or quaternary materials can be used in injection molding to prepare high impact products. The PBS in the matrix can be selected from either petrol-based PBS (Tunhe PBS in this case) or bio-based PBS (BioPBS in this case). Fillers (such as talc or *Miscanthus* fiber) can be introduced into the matrix in process through side-stuffer and corresponding composites can be fabricated. The modulus and strength are greatly improved with the addition of fillers, from 0.4 to 1.4 GPa (Modulus) with an acceptable impact strength which can be used in many applications.

Composites Based on a Prepared Compatibilized Matrix

TABLE 10

The properties of the injection molding composites: HIPBS blending with other biodegradable polymers

| Samples | Tension Modulus (MPa) | Tension Strength (MPa) | Elongation at Yield (%) | Elongation at break (%) | Flexure Modulus (MPa) | Flexure strength (MPa) | Impact strength (J/m) | HDT (° C.) | MFI (g/10 min) (210° C., 7.16 kg) |
|---|---|---|---|---|---|---|---|---|---|
| HIPBS | 460 (12.64) | 47.3 (0.75) | 27.17 (0.17) | 146.07 (6.82) | 379 (6.8) | 16.36 (0.28) | 689.233 (47.989) | 82.5 | 0.16 |
| Blending with PHBV | | | | | | | | | |
| 80 wt % (HIPBS)/ 20 wt % PHBV | 846 (55.69) | 34.5 (0.35) | 17.02 (0.23) | 133.93 (0.52) | 786 (40.03) | 28.69 (0.85) | 163.18 (82.215) | 77.65 | 19.54 |

TABLE 10-continued

The properties of the injection molding composites: HIPBS blending with other biodegradable polymers

| Samples | Tension Modulus (MPa) | Tension Strength (MPa) | Elongation at Yield (%) | Elongation at break (%) | Flexure Modulus (MPa) | Flexure strength (MPa) | Impact strength (J/m) | HDT (° C.) | MFI (g/10 min) (210° C., 7.16 kg) |
|---|---|---|---|---|---|---|---|---|---|
| Blending with PLA | | | | | | | | | |
| 95 wt % HIPBS/ 5 wt % PLA | 660 (21.27) | 44.7 (0.62) | 20.06 (0.07) | 121.85 (4.87) | 541 (15.24) | 22.69 (0.54) | 781.58 (59.28) | 64.92 | 0.28 |
| 90 wt % HIPBS/ 10 wt % PLA | 804 (17.37) | 43.1 (0.67) | 19.01 (0.16) | 132.92 (7.18) | 658 (20.54) | 26.9 (0.77) | 823.05 (56.94) | 62.90 | 0.38 |
| Blending with PBS | | | | | | | | | |
| 80 wt % (HIPBS)/ 20 wt % PBS | 621 (11.51) | 47.2 (0.83) | 20.74 (0.16) | 138.09 (11.38) | 581 (6.76) | 24.51 (0.24) | 670.12 (25.60) | 82.0 | 0.63 |
| 60 wt % (HIPBS)/ 40 wt % PBS | 735 (15.92) | 47.9 (0.74) | 20.06 (0.10) | 155.90 (8.61) | 603 (32.21) | 25.72 (1.20) | 449.47 (38.45) | 89.1 | 1.9 |

Note:
HIPBS = PBS 80 -PBAT 20 -Luperox 0.02

The binary blends presented in these examples are based on a combination of a prepared compatibilized super-tough (PBS80-PBAT20-Luperox 0.02 in this case) matrix and another selected (PHBV or PLA in this case) biodegradable polymer. The matrix can also be selected from other compatibilized super tough biodegradable polymers but not limited to PBS95-PBAT5-Luperox 0.02, PLA60-PBS20-PBAT20-Luperox0.02, et al. The second biodegradable polymer can also be selected from but not limited to PHBV, PLA, PCL, PBS, PBAT, et al. Normally biodegradable materials with high MFI are selected. Each biodegradable polymer may vary in the range of 0.01 to 99 wt % by weight of the whole composites.

As shown in Table 10, blending prepared super-tough matrix with other biodegradable materials can modify the properties of the matrix. The incorporation of PHBV, PLA or PBS can both increase the modulus of the sample, while remaining high impact strength. More notably such blends in presence of other biodegradable polymers made most innovative biodegradable composites with increased melt flow index (MFI) values. With introduction of 20 wt % PHBV, we could achieve an increase of MFI by ~120 times from 0.16 to ~19.54 g/10 min. The blending with high PBS loadings also increases the MFI of the sample while remaining high impact strength. Meanwhile, the composites maintain high melt strength because of the used super-tough matrix and zero gel content because of the low luperox used in preparing the matrix.

High Barrier Composites Based on a Prepared Compatibilized Matrix

TABLE 11

The water and oxygen barrier properties of the compression samples: HIPBS blending with different kinds of talc

| Sample | OTR (cc/m²-day) | Permeation (O2) (cc · mil/m²-day) | WVTR (g/m²-day) | Permeation (water) (g · mil/m²-day) |
|---|---|---|---|---|
| HIPBS | 43.0 | 786.6 | 37.3 | 851.6 |
| HIPBS-Talc1 | 3.6 | 126.6 | 4.1 | 137.2 |
| HIPBS-Talc2 | 6.7 | 179.3 | 6.7 | 210.6 |
| HIPBS-Talc3 | 8.8 | 249.5 | 10.2 | 297.8 |

The water and oxygen barrier properties of the high impact PBS with different talc are shown in Table 11. The polymer matrix used here is super toughened high impact PBS, talc fillers are different kinds of talc. The matrix can also be selected from other compatibilized super tough biodegradable polymers but not limited to PBS nano-blends, PLA ternary blends or quaternary blends et, al. The filler can also be selected from but not limited to nano-clay, microcrystal cellulose, nano cellulose fiber, *Miscanthus* fiber and other biomass fillers and the loading of the filler can be changed from 1 wt % to 60 wt %.

As shown in Table 11, the incorporation of the talc fillers can improve the barrier properties of the biodegradable blends while remaining high melt strength and toughness. Casting or blown film, thermoforming packaging can be fabricated with high contents of fillers, ensuring the cost competitive and high barrier properties. The water barrier of the HIPBS-Talc1 is comparable to the polystyrene (PS) and oxygen barrier of the HIPBS-Talc1 is comparable to the polyethylene terephthalate (PET) (from the data reported by SABIC, ltd. [47]), making the composites a promising candidate in the barrier packaging industries.

It is to be understood that while the disclosure has been described in conjunction with the above embodiments, that the foregoing description and examples are intended to illustrate and not limit the scope of the disclosure. Other aspects, advantages and modifications within the scope of the disclosure will be apparent to those skilled in the art to which the disclosure pertains.

Unless otherwise defined, all technical and scientific terms used herein have the same meaning as commonly understood by one of ordinary skill in the art to which this disclosure belongs.

The embodiments illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the disclosure. Thus, it should be understood that although the present disclosure has been specifically disclosed by specific embodiments and optional features, modification, improvement and variation of the embodiments therein herein disclosed may be resorted to by those skilled in the art, and that such modifications, improvements and variations are considered to be within the scope of this disclosure. The blends, composites, articles, methods and examples provided here are representative of particular embodiments, are exemplary, and are not intended as limitations on the scope of the disclosure.

The scope of the disclosure has been described broadly and generically herein. Each of the narrower species and subgeneric groupings falling within the generic disclosure also form part of the disclosure. This includes the generic description with a proviso or negative limitation removing any subject matter from the genus, regardless of whether or not the excised material is specifically recited herein.

In addition, where features or aspects of the disclosure are described in terms of Markush groups, those skilled in the art will recognize that embodiments of the disclosure may also thereby be described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions provided in this disclosure, will control.

REFERENCE

1. Kfoury, G., et al., *Recent advances in high performance poly(lactide): from "green" plasticization to super-tough materials via (reactive) compounding.* Frontiers in Chemistry, 2013. 1: p. 32.
2. Reddy, M. M., et al., *Biobased plastics and bionanocomposites: Current status and future opportunities.* Progress in Polymer Science, 2013(0).
3. Wu, S., *Chain structure, phase morphology, and toughness relationships in polymers and blends.* Polymer Engineering & Science, 1990. 30(13): p. 753-761.
4. Arends, C., *Polymer toughening.* Vol. 30. 1996: CRC Press.
5. Perkins, W. G., *Polymer toughness and impact resistance.* Polymer Engineering & Science, 1999. 39(12): p. 2445-2460.
6. Ha, C.-S., et al., *Fracture toughness and properties of plasticized PVC and thermoplastic polyurethane blends.* Polymer, 1998. 39(20): p. 4765-4772.
7. Sha, Y., et al., *Fracture toughness and failure mechanisms of epoxy/rubber-modified polystyrene (HIPS) interfaces reinforced by grafted chains.* Macromolecules, 1996. 29(13): p. 4728-4736.
8. Zhang, H., et al., *Temperature dependence of crack initiation fracture toughness of various nanoparticles filled polyamide 66.* Polymer, 2006. 47(2): p. 679-689.
9. Mouzakis, D. E., et al., *Fracture toughness assessment of poly (ethylene terephthalate) blends with glycidyl methacrylate modified polyolefin elastomer using essential work of fracture method.* Journal of applied polymer science, 2001. 79(5): p. 842-852.
10. Chen, H., et al., *Fracture toughness of α-and β-phase polypropylene homopolymers and random-and block-copolymers.* Polymer, 2002. 43(24): p. 6505-6514.
11. Schneiderman, D. K. and M. A. Hillmyer, *50th Anniversary Perspective: There Is a Great Future in Sustainable Polymers.* Macromolecules, 2017. 50(10): p. 3733-3749.
12. Tzoganakis, C., *Reactive extrusion of polymers: A review.* Advances in Polymer Technology, 1989. 9(4): p. 321-330.
13. Tadmor, Z. and C. G. Gogos, *Principles Of Polymer Processing.* 2006, United States of America: A John Wiley & Sons, Inc. 982.
14. Biesenberger, J. and C. Gogos, *Reactive polymer processing.* Polymer Engineering & Science, 1980. 20(13): p. 838-846.
15. Roegiers, K., *Impact strength polypropylene.* 2002, Google Patents.
16. Takamura, M., et al., *Influence of extrusion temperature on molecular architecture and crystallization behavior of peroxide-induced slightly crosslinked poly(L-lactide) by reactive extrusion.* Journal of Applied Polymer Science, 2012. 123(3): p. 1468-1478.
17. Detyothin, S., et al., *Reactive functionalization of poly (lactic acid), PLA: Effects of the reactive modifier, initiator and processing conditions on the final grafted maleic anhydride content and molecular weight of PLA.* Polymer Degradation and Stability, 2013. 98(12): p. 2697-2708.
18. Ma, P., et al., *Structure/Property Relationships of Partially Crosslinked Poly(butylene succinate).* Macromolecular Materials and Engineering, 2013. 298(8): p. 910-918.
19. Yang, S.-l., et al., *Thermal and mechanical properties of chemical crosslinked polylactide (PLA).* Polymer Testing, 2008. 27(8): p. 957-963.
20. Wang, R., et al., *Toughening modification of PLLA/PBS blends via in situ compatibilization.* Polymer Engineering & Science, 2009. 49(1): p. 26-33.
21. Ji, D., et al., *Morphology, Rheology, Crystallization Behavior, and Mechanical Properties of Poly(lactic acid)/Poly(butylene succinate)/Dicumyl Peroxide Reactive Blends.* Journal of Applied Polymer Science, 2014. 1: p. 39580-39588.
22. Coltelli, M.-B., S. Bronco, and C. Chinea, *The effect of free radical reactions on structure and properties of poly(lactic acid) (PLA) based blends.* Polymer Degradation and Stability, 2010. 95(3): p. 332-341.
23. Ma, P., et al., *Toughening of PHBV/PBS and PHB/PBS Blends via In situ Compatibilization Using Dicumyl Peroxide as a Free-Radical Grafting Initiator.* Macromolecular Materials and Engineering, 2012. 297(5): p. 402-410.
24. Muthuraj, R., M. Misra, and A. K. Mohanty, *Biodegradable Poly(butylene succinate) and Poly(butylene adipate-co-terephthalate) Blends: Reactive Extrusion and Performance Evaluation.* Journal of Polymers and the Environment, 2014. 22(3): p. 336-349.
25. Oyama, H. T., *Super-tough poly (lactic acid) materials: Reactive blending with ethylene copolymer.* Polymer, 2009. 50(3): p. 747-751.
26. Liu, H., et al., *Effects of Metal Ion Type on Ionomer-Assisted Reactive Toughening of Poly(lactic acid).* Industrial & Engineering Chemistry Research, 2013. 52(13): p. 4787-4793.
27. Liu, H., et al., *Effects of reactive blending temperature on impact toughness of poly(lactic acid) ternary blends.* Polymer, 2012. 53(2): p. 272-276.
28. Liu, H., et al., *Super Toughened Poly(lactic acid) Ternary Blends by Simultaneous Dynamic Vulcanization and Interfacial Compatibilization.* Macromolecules, 2010. 43(14): p. 6058-6066.
29. Liu, H. Z., W. J. Song, and J. Zhang, *Interaction of Microstructure and Interfacial Adhesion on Impact Performance of Polylactide (PLA) Ternary Blends.* Macromolecules, 2011. 44(6): p. 1513-1522.

30. Yuryev, Y., A. K. Mohanty, and M. Misra, *A New Approach to Supertough Poly(lactic acid): A High Temperature Reactive Blending*. Macromolecular Materials and Engineering, 2016. 301(12): p. 1443-1453.
31. Zhang, K., et al., *Supertoughened Renewable PLA Reactive Multiphase Blends System: Phase Morphology and Performance*. ACS Applied Materials & Interfaces, 2014. 6(15): p. 12436-12448.
32. Bitinis, N., et al., *Structure and properties of polylactide/natural rubber blends*. Materials Chemistry and Physics, 2011. 129(3): p. 823-831.
33. Zhang, C., et al., *Thermal, mechanical and rheological properties of polylactide toughened by expoxidized natural rubber*. Materials & Design, 2013. 45: p. 198-205.
34. Hu, X., et al., *Preparation, morphology and superior performances of biobased thermoplastic elastomer by in situ dynamical vulcanization for 3D-printed materials*. Polymer, 2017. 108: p. 11-20.
35. Hu, X., et al., *Renewable and Supertoughened Polylactide-Based Composites: Morphology, Interfacial Compatibilization, and Toughening Mechanism*. Industrial & Engineering Chemistry Research, 2016. 55(34): p. 9195-9204.
36. Liu, G.-C., et al., *Fully Biobased and Supertough Polylactide-Based Thermoplastic Vulcanizates Fabricated by Peroxide-Induced Dynamic Vulcanization and Interfacial Compatibilization*. Biomacromolecules, 2014. 15(11): p. 4260-4271.
37. Zhang, K., M. Misra, and A. K. Mohanty, *Toughened Sustainable Green Composites from Poly(3-hydroxybutyrate-co-3-hydroxyvalerate) Based Ternary Blends and Miscanthus Biofiber*. ACS Sustainable Chemistry & Engineering, 2014. 2(10): p. 2345-2354.
38. Muthuraj, R., M. Misra, and A. K. Mohanty, *Injection Molded Sustainable Biocomposites From Poly(butylene succinate) Bioplastic and Perennial Grass*. ACS Sustainable Chemistry & Engineering, 2015. 3(11): p. 2767-2776.
39. Xanthos, M., *Reactive extrusion: principles and practice*. Hanser Publishers (Germany), 1992, 1992: p. 304.
40. Rabnawaz, M., et al., *A roadmap towards green packaging: the current status and future outlook for polyesters in the packaging industry*. Green Chemistry, 2017. 19(20): p. 4737-4753.
41. Bumbudsanpharoke, N. and S. Ko, *Nano-Food Packaging: An Overview of Market, Migration Research, and Safety Regulations*. Journal of Food Science, 2015. 80(5): p. R910-R923.
42. Reddy, M. M., et al., *Biobased plastics and bionanocomposites: Current status and future opportunities*. Progress in Polymer Science, 2013. 38: p. 1653-1689.
43. Mohanty, A. and R. Bhardwaj, Nanostructure Controlled Bioplastics in the Design and Engineering of Sustainable Multifunctional Green Materials.
44. Bhardwaj, R. and A. K. Mohanty, Modification of Brittle Polylactide by Novel Hyperbranched polymer based nanostructure. Biomacromolecules, 2007. 8: p. 2476-2484.
45. Ruzette, A.-V. and L. Leibler, Block copolymers in tomorrow's plastics. Nature materials, 2005. 4(1): p. 19-31.
46. Hiroshi Shimizu, Y. L., Akira Kaito, and H. Sano, Formation of Nanostructured PVDF/PA11 Blends Using High-Shear Processing. Macromolecules, 2005. 38: p. 7880-7883.
47. SABIC, Innovative Plastics-Oxygen and Water Permeability. 2013, SABIC: www.sabic-ip.com.

What is claimed is:

1. A nano-blend of two or more biopolymers comprising a nanostructured first biopolymer in a matrix of a second biopolymer, wherein the nanostructured first polymer is 100 nm or less in diameter, wherein (a) the first biopolymer is polybutyrate adipate terephthalate (PBAT), and the second polymer is polybutylene succinate (PBS), or (b) the first biopolymer is polybutylene succinate (PBS), and the second polymer is polybutyrate adipate terephthalate (PBAT).

2. The nano-blend of claim 1, wherein the first biopolymer is polybutyrate adipate terephthalate (PBAT), and the second polymer is polybutylene succinate (PBS).

3. The nano-blend of claim 1, wherein the first biopolymer is polybutylene succinate (PBS), and the second polymer is polybutyrate adipate terephthalate (PBAT).

4. The nano-blend of claim 1, wherein the nano-blend further includes polylactic acid (PLA).

5. The nano-blend of claim 4, wherein the nano-blend comprises 60% wt. or less of PLA.

6. The nano-blend of claim 1, wherein the nano-blend further includes poly(3-hydroxybutyrate-co-3-hydroxyvalerate) (PHBV).

7. The nano-blend of claim 6, wherein the nano-blend comprises 25% wt. or less of PHBV.

8. The nano-blend of claim 1, wherein the nano-blend comprises 25% wt. or less of PBAT.

9. The nano-blend of claim 1, wherein the nano-blend comprises 0.75 phr or less of a free radical initiator.

10. The nano-blend of claim 1, wherein the nano-blend is free of a functional monomer.

11. The nano-blend of claim 1, wherein the nano-blend is free of any gel content.

12. A biodegradable composite comprising the nano-blend of claim 1 and one or more fillers.

13. The biodegradable composite of claim 12, wherein the composite comprises up to 60% by weight of the filler.

14. The biodegradable composite of claim 12, wherein the one or more fillers is selected from the group consisting of: natural fibers from perennial grasses, cellulose and agricultural residues; inorganic mineral fillers; carbon fibers; by-products (biomass fillers) from coffee, tea and other agricultural products; and a combination thereof, and wherein the inorganic fillers include one or a combination of two or more of talc, clay and glass fiber.

15. The biodegradable composite of claim 14, wherein the perennial grasses include one or a combination of two or more of *Miscanthus*, switchgrass and bamboo.

16. The biodegradable composite of claim 12, wherein the biodegradable composite is compostable.

17. An article of manufacture comprising the biodegradable composite of claim 12.

18. An in-situ method of manufacturing a nano-blend of two or more biopolymers comprising a nanostructured first biopolymer in a matrix of a second biopolymer, wherein the nanostructured first polymer is 100 nm or less in diameter, the in-situ method comprising melting the first and the second biodegradable polymers in the presence of an amount of a free radical initiator, thereby manufacturing the nano-blend.

19. The in-situ method of claim 18, wherein the amount free radical initiator is 0.75 phr or less.

20. A nano-blend of two or more biopolymers comprising a nanostructured first biopolymer in a matrix of a second biopolymer, wherein the nanostructured first polymer is 100 nm or less in diameter and wherein the nano-blend further includes 60% wt. or less of polylactic acid (PLA).

21. A nano-blend of two or more biopolymers comprising a nanostructured first biopolymer in a matrix of a second biopolymer, wherein the nanostructured first polymer is 100 nm or less in diameter and wherein the nano-blend further includes 25% wt. or less of poly(3-hydroxybutyrate-co-3-hydroxyvalerate) (PHBV).

\* \* \* \* \*